(12) United States Patent
Wong et al.

(10) Patent No.: US 9,552,676 B2
(45) Date of Patent: *Jan. 24, 2017

(54) WEARABLE COMPUTER WITH NEARBY OBJECT RESPONSE

(71) Applicant: Google Inc., Mountain View, CA (US)

(72) Inventors: Adrian Wong, Mountain View, CA (US); Xiaoyu Miao, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,852

(22) Filed: Apr. 19, 2016

(65) Prior Publication Data

US 2016/0232717 A1 Aug. 11, 2016

Related U.S. Application Data

(63) Continuation of application No. 14/737,745, filed on Jun. 12, 2015, now Pat. No. 9,341,849, which is a
(Continued)

(51) Int. Cl.
*G09G 5/00* (2006.01)
*G06T 19/00* (2011.01)
(Continued)

(52) U.S. Cl.
CPC ......... *G06T 19/006* (2013.01); *G02B 27/0093* (2013.01); *G02B 27/017* (2013.01);
(Continued)

(58) Field of Classification Search
CPC ............ G01C 21/365; B60R 2300/205; G09G 2380/10; G06F 3/013; G06F 3/0482; G06F 3/167; G06K 9/00664; H04N 13/0468–13/0484; G02B 2027/0141;G02B 27/0093; G02B 27/017; G02B 27/0172; G02B 27/0176; G02B 2027/014; G02B 2027/0178; G02B 2027/0138; G02B 2027/015; G06T 19/006; G06T 2200/24
See application file for complete search history.

(56) References Cited

U.S. PATENT DOCUMENTS 5,850,211 A 12/1998 Tognazzini
5,880,733 A 3/1999 Horvitz et al.
(Continued)

FOREIGN PATENT DOCUMENTS

EP 2211224 A1 7/2010

OTHER PUBLICATIONS

Bernatchz et al., "Impact of Spatial Reference Frames on Human Performance in Virtual Reality User Interfaces," Journal of Multimedia, Dec. 2008, pp. 19-32, vol. 3, No. 5.
(Continued)

*Primary Examiner* — Amare Mengistu
*Assistant Examiner* — Crystal A Mathews
(74) *Attorney, Agent, or Firm* — McDonnell Boehnen Hulbert & Berghoff LLP

(57) ABSTRACT

Exemplary methods and systems relate to detecting physical objects near a substantially transparent head-mounted display (HMD) system and activating a collision-avoidance action to alert a user of the detected objects. Detection techniques may include receiving data from distance and/or relative movement sensors and using this data as a basis for determining an appropriate collision-avoidance action. Exemplary collision-avoidance actions may include de-emphasizing virtual objects displayed on the HMD to provide a less cluttered view of the physical objects through the substantially transparent display and/or presenting new virtual objects.

20 Claims, 17 Drawing Sheets

Related U.S. Application Data continuation of application No. 13/267,963, filed on Oct. 7, 2011, now Pat. No. 9,081,177.

(51) Int. Cl.

| | | |
|---|---|---|
| *G06F 3/01* | (2006.01) | |
| *G02B 27/00* | (2006.01) | |
| *G02B 27/01* | (2006.01) | |
| *G06F 3/0482* | (2013.01) | |
| *G06F 3/16* | (2006.01) | |
| *G06K 9/00* | (2006.01) | |

(52) U.S. Cl.
CPC ..... *G02B 27/0172* (2013.01); *G02B 27/0176* (2013.01); *G06F 3/013* (2013.01); *G06F 3/0482* (2013.01); *G06F 3/167* (2013.01); *G06K 9/00664* (2013.01); *G02B 2027/014* (2013.01); *G02B 2027/015* (2013.01); *G02B 2027/0138* (2013.01); *G02B 2027/0178* (2013.01); *G06T 2200/24* (2013.01)

(56) References Cited

U.S. PATENT DOCUMENTS

| | | | |
|---|---|---|---|
| 5,900,849 A | 5/1999 | Gallery | |
| 5,977,935 A | 11/1999 | Yasukawa et al. | |
| 6,064,749 A | 5/2000 | Hirota et al. | |
| 6,124,843 A | 9/2000 | Kodama | |
| 6,184,847 B1 | 2/2001 | Fateh et al. | |
| 6,292,158 B1 | 9/2001 | Amafuji et al. | |
| 6,292,198 B1 | 9/2001 | Matsuda et al. | |
| 6,327,522 B1 | 12/2001 | Kojima et al. | |
| 6,353,436 B1 | 3/2002 | Reichlen | |
| 6,396,497 B1 | 5/2002 | Reichlen | |
| 6,603,491 B2 | 8/2003 | Lemelson et al. | |
| 6,771,294 B1 | 8/2004 | Pulli et al. | |
| 6,803,928 B2 | 10/2004 | Bimber et al. | |
| 6,951,515 B2 | 10/2005 | Ohshima et al. | |
| 7,113,151 B2 | 9/2006 | Kinebuchi | |
| 7,199,807 B2 | 4/2007 | Kobayashi et al. | |
| 7,487,462 B2 | 2/2009 | Good et al. | |
| 7,693,702 B1 | 4/2010 | Kerner et al. | |
| 7,724,278 B2 | 5/2010 | Maguire, Jr. | |
| 7,825,996 B2 | 11/2010 | Yamada et al. | |
| 7,928,926 B2 | 4/2011 | Yamamoto et al. | |
| 8,405,680 B1 | 3/2013 | Cardoso Lopes et al. | |
| 8,477,108 B2 | 7/2013 | Waller et al. | |
| 9,081,177 B2 * | 7/2015 | Wong | G02B 27/0093 |
| 9,341,849 B2 * | 5/2016 | Wong | G02B 27/0093 |
| 2001/0006376 A1 | 7/2001 | Numa | |
| 2002/0044152 A1 | 4/2002 | Abbott et al. | |
| 2002/0105482 A1 | 8/2002 | Lemelson et al. | |
| 2002/0126066 A1 | 9/2002 | Yasukawa et al. | |
| 2002/0158827 A1 | 10/2002 | Zimmerman | |
| 2003/0020707 A1 | 1/2003 | Kangas et al. | |
| 2003/0210228 A1 | 11/2003 | Ebersole et al. | |
| 2003/0210380 A1 | 11/2003 | Westort et al. | |
| 2004/0046711 A1 | 3/2004 | Triebfuerst | |
| 2004/0093141 A1 | 5/2004 | Rao et al. | |
| 2004/0239670 A1 | 12/2004 | Marks | |
| 2005/0104882 A1 | 5/2005 | Kobayashi et al. | |
| 2005/0154505 A1 | 7/2005 | Nakamura et al. | |
| 2006/0080604 A1 | 4/2006 | Anderson | |
| 2006/0090135 A1 | 4/2006 | Fukuda | |
| 2006/0139374 A1 | 6/2006 | Ritter et al. | |
| 2007/0035563 A1 | 2/2007 | Biocca et al. | |
| 2007/0241936 A1 | 10/2007 | Arthur et al. | |
| 2008/0005702 A1 | 1/2008 | Skourup et al. | |
| 2008/0082939 A1 | 4/2008 | Nash et al. | |
| 2008/0094417 A1 | 4/2008 | Cohen | |
| 2008/0150965 A1 | 6/2008 | Bischoff et al. | |
| 2008/0218515 A1 | 9/2008 | Fukushima et al. | |
| 2009/0005961 A1 | 1/2009 | Grabowski et al. | |
| 2009/0128449 A1 | 5/2009 | Brown et al. | |
| 2009/0140845 A1 | 6/2009 | Hioki | |
| 2009/0153976 A1 | 6/2009 | Dolgoff | |
| 2009/0172596 A1 | 7/2009 | Yamashita | |
| 2009/0187389 A1 | 7/2009 | Dobbins et al. | |
| 2009/0208052 A1 | 8/2009 | Kaplan | |
| 2009/0278917 A1 | 11/2009 | Dobbins et al. | |
| 2010/0007807 A1 | 1/2010 | Galstian et al. | |
| 2010/0013739 A1 | 1/2010 | Sako et al. | |
| 2010/0026629 A1 | 2/2010 | Toebes et al. | |
| 2010/0125799 A1 | 5/2010 | Roberts et al. | |
| 2010/0149073 A1 | 6/2010 | Chaum et al. | |
| 2010/0159434 A1 | 6/2010 | Lampotang et al. | |
| 2010/0164990 A1 | 7/2010 | Van Doorn | |
| 2010/0177403 A1 | 7/2010 | Dolgoff | |
| 2010/0205563 A1 | 8/2010 | Haapsaari et al. | |
| 2010/0253700 A1 | 10/2010 | Bergeron | |
| 2010/0277496 A1 | 11/2010 | Kawanishi et al. | |
| 2010/0283683 A1 | 11/2010 | Kurokawa | |
| 2010/0292886 A1 | 11/2010 | Szczerba et al. | |
| 2011/0115703 A1 | 5/2011 | Iba et al. | |
| 2011/0140994 A1 | 6/2011 | Noma | |
| 2011/0161875 A1 | 6/2011 | Kankainen | |
| 2011/0214082 A1 | 9/2011 | Osterhout et al. | |
| 2011/0221668 A1 | 9/2011 | Haddick et al. | |
| 2012/0212399 A1 | 8/2012 | Border et al. | |
| 2012/0224060 A1 | 9/2012 | Gurevich et al. | |
| 2012/0293548 A1 | 11/2012 | Perez et al. | |
| 2012/0306850 A1 | 12/2012 | Balan et al. | |
| 2013/0044128 A1 | 2/2013 | Liu et al. | |
| 2013/0278631 A1 | 10/2013 | Border et al. | |
| 2013/0300637 A1 | 11/2013 | Smits et al. | |
| 2013/0328762 A1 | 12/2013 | McCulloch et al. | |

OTHER PUBLICATIONS

Office Action for U.S. Appl. No. 13/186,692 mailed Jun. 3, 2014, 30 pages.

David E. Breen et al., "Interactive Occlusion and Automatic Object Placement for Augmented Reality," Computer Graphics Forum, vol. 15, Issue 3 (Aug. 1996), pp. 11-22.

Cohn, "On the Back of the Bus," 21 University of California Transportation Center: Access Magazine 17-21 (2002).

* cited by examiner

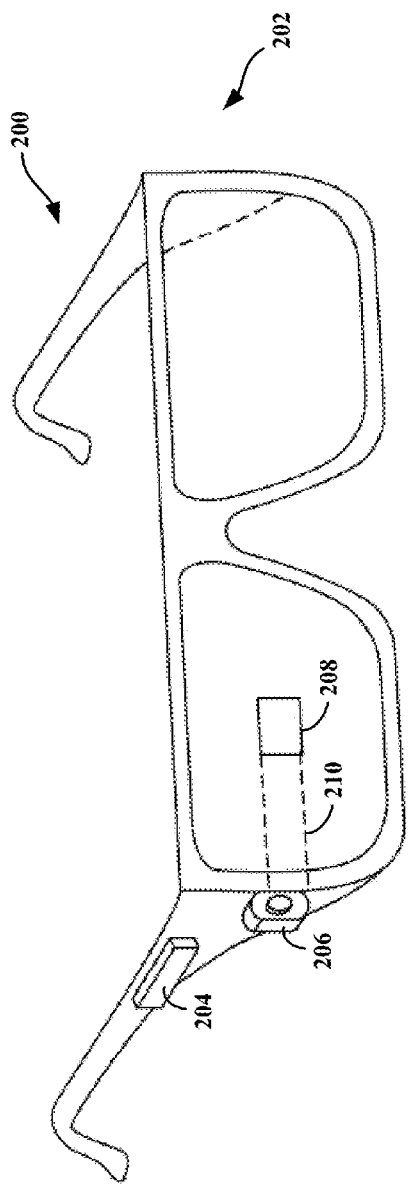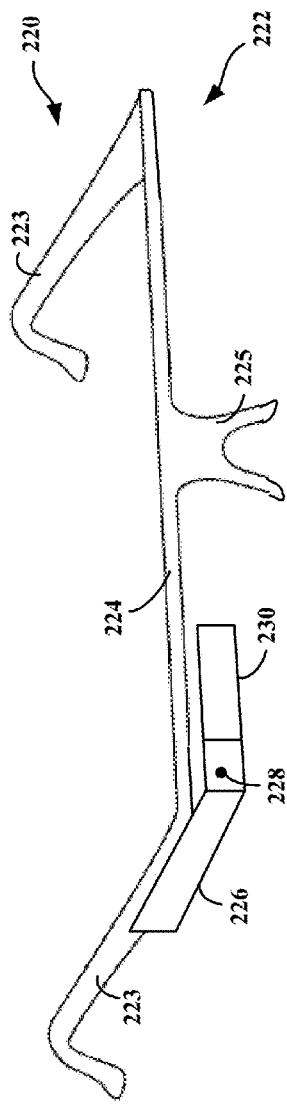
FIG. 2A
FIG. 2B

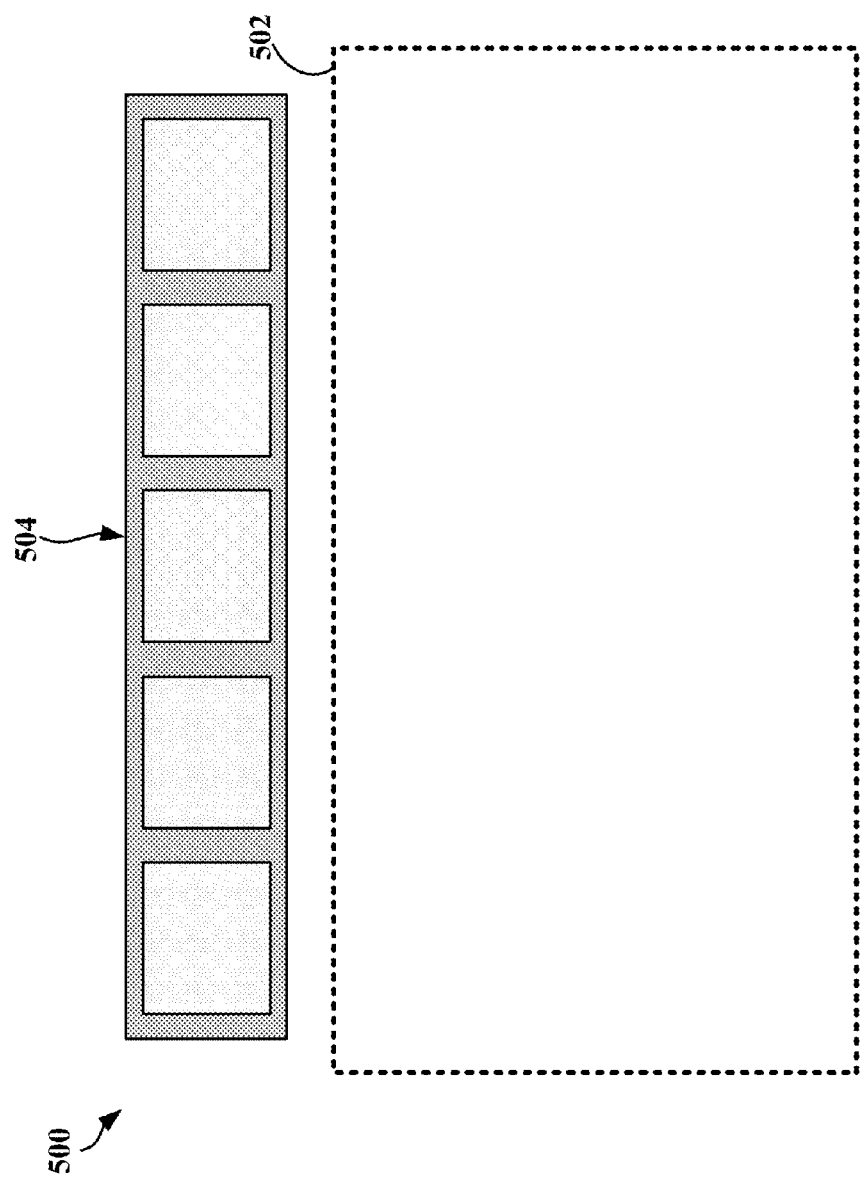

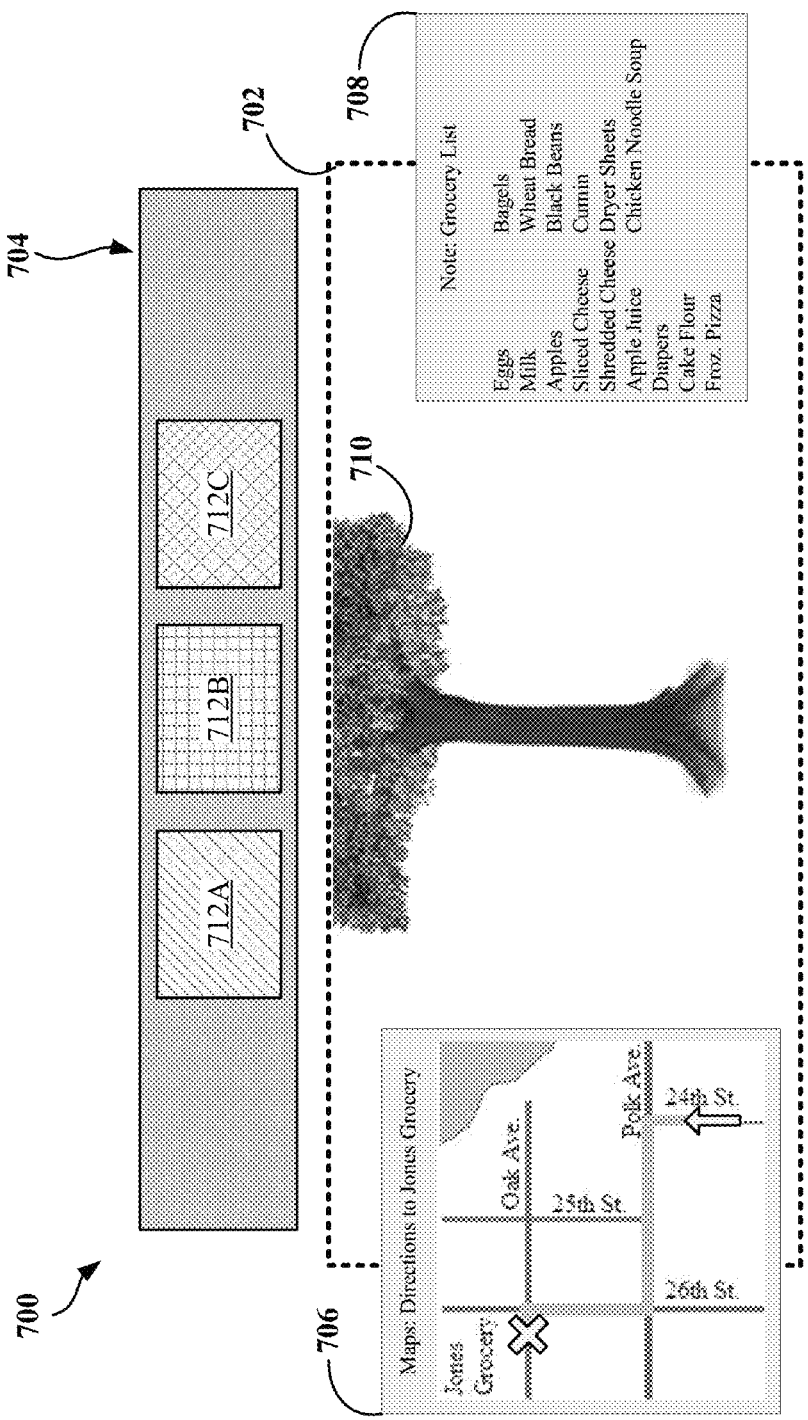

WEARABLE COMPUTER WITH NEARBY OBJECT RESPONSE

CROSS REFERENCE TO RELATED APPLICATIONS

This application is a continuation of U.S. patent application Ser. No. 14/737,745, filed Jun. 12, 2015, which is a continuation of U.S. patent application Ser. No. 13/267,963, filed Oct. 7, 2011, both of which are incorporated by reference herein in their entirety for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary method involves detecting a physical object near a head-mounted display (HMD) system and activating a collision-avoidance action, including modifying the content displayed on the HMD. To perform these actions, an exemplary method may involve providing the HMD with a user-interface, which includes a displayed view region and a content region that may be not displayed initially. The HMD may then display the provided user-interface on a substantially transparent display so that when an object is detected, content displayed in the view region may be de-emphasized to draw attention to provide an unobstructed view of the detected object.

In another aspect, an exemplary apparatus may be a wearable computer that includes a processor and instructions executable by the processor. The instructions may allow the processor to activate a collision-avoidance action in response to determining that a physical object represents a potential risk of collision with the wearer of the wearable computer. The risk-determination process may include receiving and processing data from one or more sensors. Additionally, the wearable computer may provide a user-interface to an HMD and the collision-avoidance action may include modifying the provided user-interface to inform a wearer of the wearable computer of the detected object.

In another aspect, an exemplary non-transitory computer-readable medium may contain instructions to activate a collision-avoidance action in response to determining that a physical object represents a potential risk of collision with an HMD system. The risk-determination process may include receiving and processing data from one or more sensors. Additionally, medium may include instructions to provide a user-interface to the HMD and the collision-avoidance action may include modifying the provided user-interface.

BRIEF DESCRIPTION OF THE DRAWINGS

FIG. 2A illustrates an example system for receiving, transmitting, and displaying data.

FIG. 2B illustrates an example system for receiving, transmitting, and displaying data.

FIG. 5A shows aspects of an example user-interface.

FIG. 7E illustrates an exemplary user-interface and a portion of the physical field of view beyond the display after activating an exemplary collision-avoidance action.

DETAILED DESCRIPTION

Figure 1A:
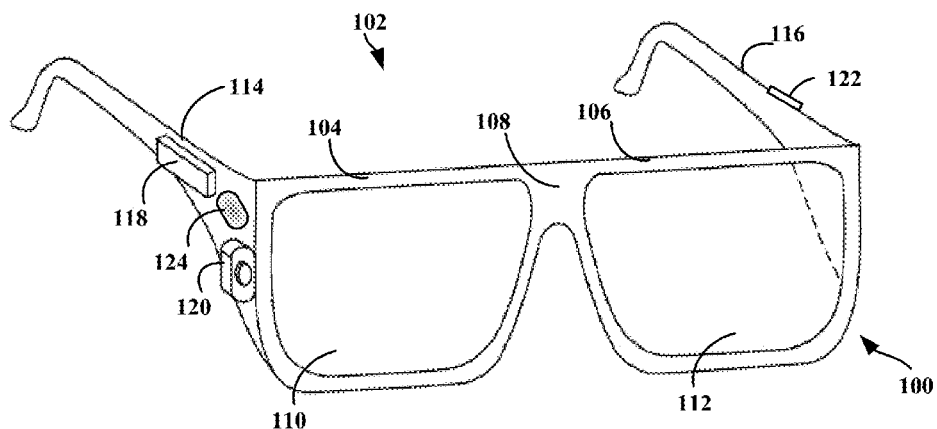
FIG. 1A illustrates an example head-mounted display system.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

1. Overview

A wearable computer may include a head-mounted display (HMD) that presents virtual objects (e.g., graphical media content such as text, images, application windows, or video) on a substantially transparent display screen. Hence, the wearer of the HMD may maintain a view the physical world while also viewing and interacting with the virtual objects that are displayed over their physical field of vision. However, this overlay of virtual objects in the HMD may obstruct the wearer's view of real-world objects, inhibiting the instinctive response to avoid potential hazards.

To help avoid this danger, the wearable computer may be configured to detect approaching and/or nearby objects and alert the wearer of the potential risk. For example, real-world objects may be detected using a number of different sensors, including cameras, acoustic sensors, and/or laser-based detection systems, among others. Exemplary alert techniques may likewise take on many forms, including de-emphasizing virtual objects, presenting audio alerts, and/or displaying new virtual objects to highlight the physical object, among others.

The object detection procedure may run continuously as a background process on the wearable computer or it may run only when activated by the wearer. Alternatively, an automated process may initiate the detection procedure in response to a determined need. For instance, the wearable computer may use an accelerometer to detect when the wearer is in motion and automatically begin the object detection method, deactivating the process when the wearer again comes to rest. As another example, the computer may monitor the quantity and size of the displayed virtual objects and automatically activate the object detection method when the display is sufficiently cluttered to obstruct the wearer's view.

2. Example System and Device Architecture

FIG. 1A illustrates an example system 100 for receiving, transmitting, and displaying data. The system 100 is shown in the form of a wearable computing device. While FIG. 1A illustrates a head-mounted device 102 as an example of a wearable computing device, other types of wearable computing devices could additionally or alternatively be used. As illustrated in FIG. 1A, the head-mounted device 102 has frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be connected by wires or wirelessly connected to the head-mounted device 102). The on-board computing system 118 may include a processor and memory, for example. The on-board computing system 118 may be configured to receive and analyze data from the video camera 120, the sensor 122, and the finger-operable touch pad 124 (and possibly from other sensory devices, user-interfaces, or both) and generate images for output by the lens elements 110 and 112. The on-board computing system 118 may additionally include a speaker or a microphone for user input (not shown). An example computing system is further described below in connection with FIG. 4.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Video cameras with a small form-factor, such as those used in cell phones or webcams, for example, may be incorporated into an example embodiment of the system 100.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
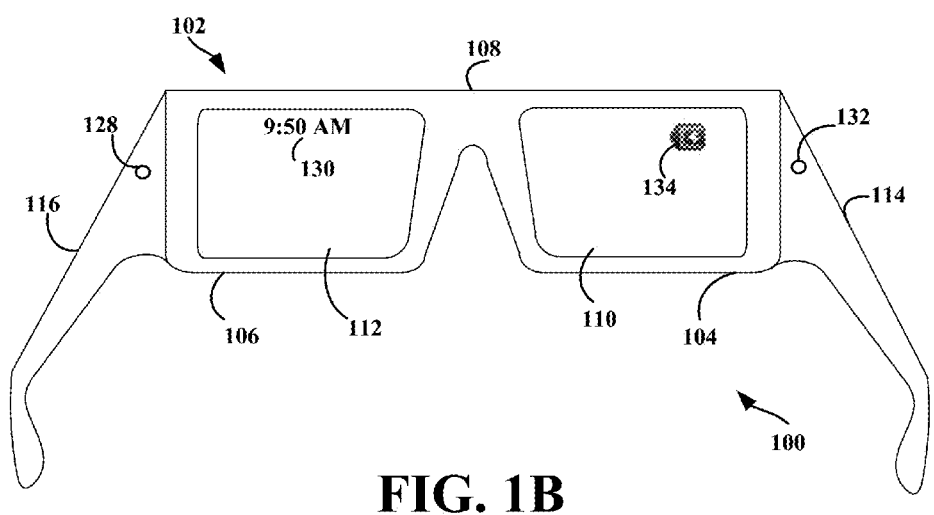
FIG. 1B illustrates an alternate view of the system illustrated in FIG. 1A.

FIG. 1B illustrates an alternate view of the system 100 illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may be omitted (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. Other possibilities exist as well.

FIG. 2A illustrates an example system 200 for receiving, transmitting, and displaying data. The system 200 is shown in the form of a wearable computing device 202. The wearable computing device 202 may include frame elements and side-arms such as those described with respect to FIGS. 1A and 1B. The wearable computing device 202 may additionally include an on-board computing system 204 and a video camera 206, such as those described with respect to FIGS. 1A and 1B. The video camera 206 is shown mounted on a frame of the wearable computing device 202; however, the video camera 206 may be mounted at other positions as well.

As shown in FIG. 2A, the wearable computing device 202 may include a single display 208 which may be coupled to the device. The display 208 may be formed on one of the lens elements of the wearable computing device 202, such as a lens element described with respect to FIGS. 1A and 1B, and may be configured to overlay computer-generated graphics in the user's view of the physical world. The display 208 is shown to be provided in a center of a lens of the wearable computing device 202; however, the display 208 may be provided in other positions. The display 208 is controllable via the computing system 204 that is coupled to the display 208 via an optical waveguide 210.

FIG. 2B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 2B, the center frame support 224 connects the side-arms 223. The wearable computing device 222 does not include lens-frames containing lens elements. The wearable computing device 222 may additionally include an on-board computing system 226 and a video camera 228, such as those described with respect to FIGS. 1A and 1B.

The wearable computing device 222 may include a single lens element 230 that may be coupled to one of the side-arms 223 or the center frame support 224. The lens element 230 may include a display such as the display described with reference to FIGS. 1A and 1B, and may be configured to overlay computer-generated graphics upon the user's view of the physical world. In one example, the single lens element 230 may be coupled to a side of the extending side-arm 223. The single lens element 230 may be positioned in front of or proximate to a user's eye when the wearable computing device 222 is worn by a user. For example, the single lens element 230 may be positioned below the center frame support 224, as shown in FIG. 2B.

Figure 3:
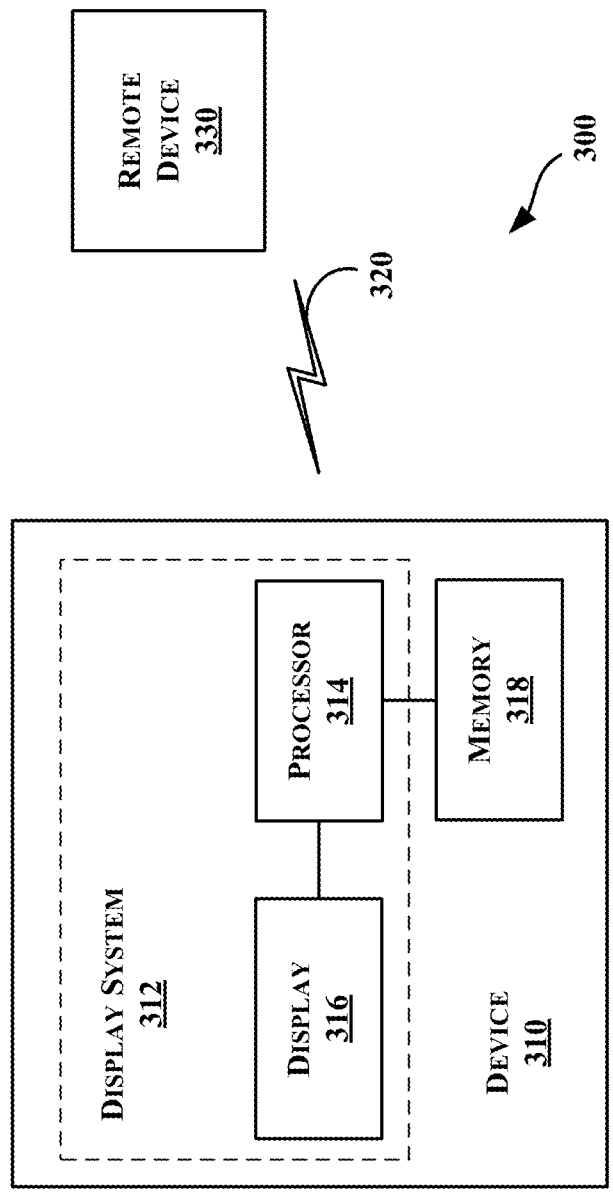
FIG. 3 shows a simplified block diagram of an example computer network infrastructure.

FIG. 3 shows a simplified block diagram of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, the device 310 may be a heads-up display system, such as the head-mounted device 102, 200, or 220 described with reference to FIGS. 1A-2B.

Thus, the device 310 may include a display system 312 comprising a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 and the device 310 may contain hardware to enable the communication link 320, such as processors, transmitters, receivers, antennas, etc.

In FIG. 3, the communication link 320 is illustrated as a wireless connection; however, wired connections may also be used. For example, the communication link 320 may be a wired serial bus such as a universal serial bus or a parallel bus, among other connections. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 330 may be accessible via the Internet and may include a computing cluster associated with a particular web service (e.g., social-networking, photo sharing, address book, etc.).

Figure 4:
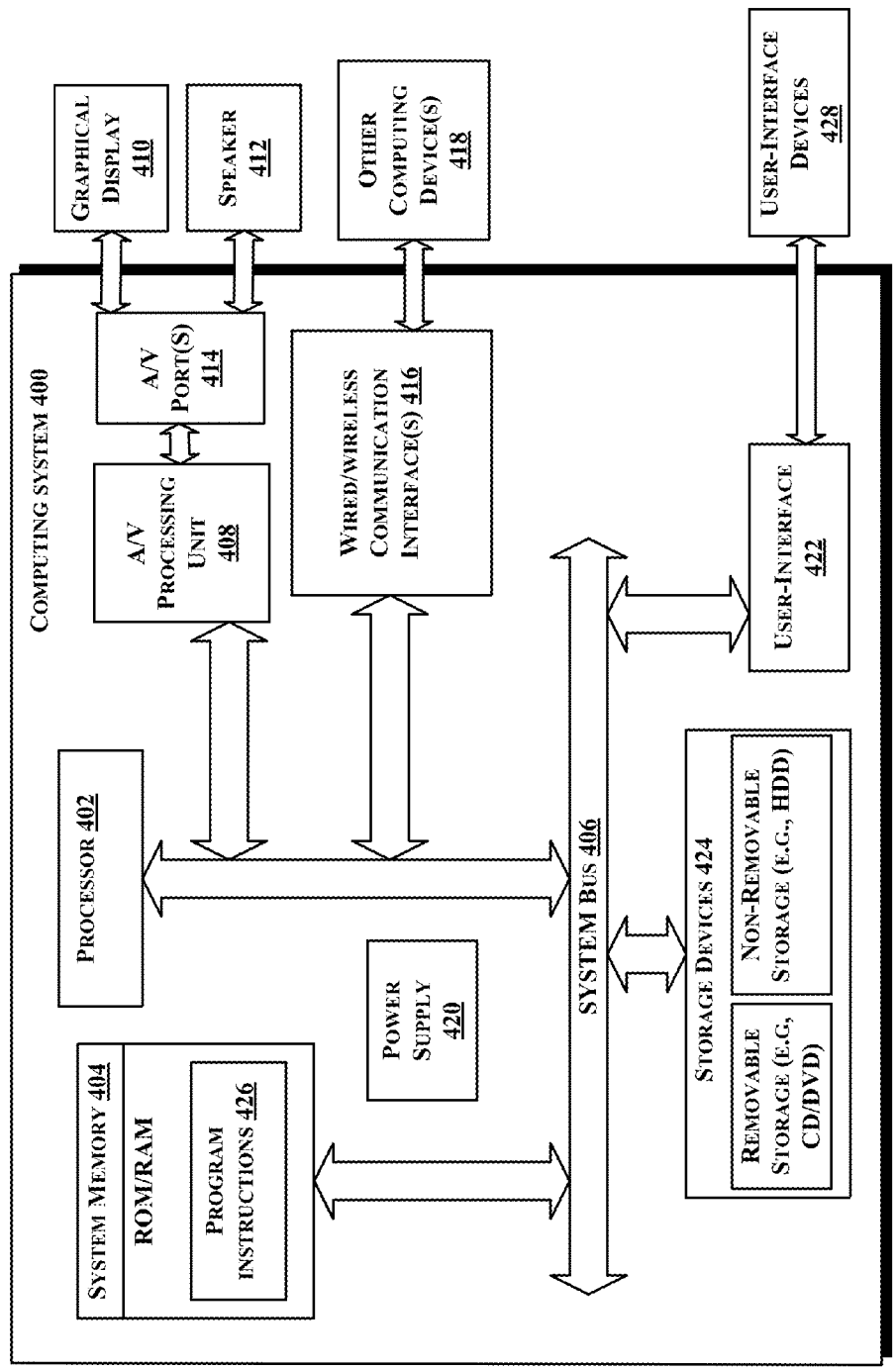
FIG. 4 shows a simplified block diagram depicting example components of an example computing system.

As described above in connection with FIGS. 1A-2B, an example wearable computing device may include, or may otherwise be communicatively coupled to, a computing system, such as computing system 118 or computing system 204. FIG. 4 shows a simplified block diagram depicting example components of an example computing system 400. One or both of the device 310 and the remote device 330 may take the form of computing system 400.

Computing system 400 may include at least one processor 402 and system memory 404. In an example embodiment, computing system 400 may include a system bus 406 that communicatively connects processor 402 and system memory 404, as well as other components of computing system 400. Depending on the desired configuration, processor 402 can be any type of processor including, but not limited to, a microprocessor (μP), a microcontroller (μC), a digital signal processor (DSP), or any combination thereof. Furthermore, system memory 404 can be of any type of memory now known or later developed including but not limited to volatile memory (such as RAM), non-volatile memory (such as ROM, flash memory, etc.) or any combination thereof.

An example computing system 400 may include various other components as well. For example, computing system 400 includes an A/V processing unit 408 for controlling graphical display 410 and speaker 412 (via A/V port 414), one or more communication interfaces 416 for connecting to other computing devices 418, and a power supply 420. Graphical display 410 may be arranged to provide a visual depiction of various input regions provided by user-interface module 422. For example, user-interface module 422 may be configured to provide a user-interface, such as the example user-interface described below in connection with FIGS. 5A-D, and graphical display 410 may be configured to provide a visual depiction of the user-interface. User-interface module 422 may be further configured to receive data from and transmit data to (or be otherwise compatible with) one or more user-interface devices 428.

Furthermore, computing system 400 may also include one or more data storage devices 424, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 400.

According to an example embodiment, computing system 400 may include program instructions 426 that are stored in system memory 404 (and/or possibly in another data-storage medium) and executable by processor 402 to facilitate the various functions described herein including, but not limited to, those functions described with respect to [METHOD FIGURES]. Although various components of computing system 400 are shown as distributed components, it should be understood that any of such components may be physically integrated and/or distributed according to the desired configuration of the computing system.

3. Example User-Interface

FIGS. 5A-D show aspects of an example user-interface 500. The user-interface 500 may be displayed by, for example, a wearable computing device as described above for FIGS. 1A-2B.

An example state of the user-interface 500 is shown in FIG. 5A. The example state shown in FIG. 5A may correspond to a first position of the wearable computing device. That is, the user-interface 500 may be displayed as shown in FIG. 5A when the wearable computing device is in the first position. In some embodiments, the first position of the wearable computing device may correspond to a position of the wearable computing device when a wearer of the wearable computing device is looking in a direction that is generally parallel to the ground (e.g., a position that does not correspond to the wearer looking up or looking down). Other examples are possible as well.

As shown, the user-interface 500 includes a view region 502. An example boundary of the view region 502 is shown by a dotted frame. While the view region 502 is shown to have a landscape shape (in which the view region 502 is wider than it is tall), in other embodiments the view region 502 may have a portrait or square shape, or may have a non-rectangular shape, such as a circular or elliptical shape. The view region 502 may have other shapes as well.

The view region 502 may be, for example, the viewable area between (or encompassing) the upper, lower, left, and right boundaries of a display on the wearable computing device, or in other words, may substantially fill the display in an HMD. As shown, when the wearable computing device is in the first position, the view region 502 is substantially empty (e.g., completely empty) of user-interface elements, such that the user's view of their real-world environment is generally uncluttered, and objects in the user's environment are not obscured.

In some embodiments, the view region 502 may correspond to a field of view of a wearer of the wearable computing device, and an area outside the view region 502 may correspond to an area outside the field of view of the wearer. In other embodiments, the view region 502 may correspond to a non-peripheral portion of a field of view of a wearer of the wearable computing device, and an area outside the view region 502 may correspond to a peripheral portion of the field of view of the wearer. In still other embodiments, the user-interface 500 may be larger than or substantially the same as a field of view of a wearer of the wearable computing device, and the field of view of the wearer may be larger than or substantially the same size as the view region 502. The view region 502 may take other forms as well.

Accordingly, the portions of the user-interface 500 outside of the view region 502 may be outside of or in a peripheral portion of a field of view of a wearer of the wearable computing device. For example, as shown, a menu 504 may be outside of or in a peripheral portion of the field of view of the user in the user-interface 500. While the menu 504 is shown to be not visible in the view region 502, in some embodiments the menu 504 may be partially visible in the view region 502.

In some embodiments, the wearable computing device may be configured to receive movement data corresponding to, for example, an upward movement of the wearable computing device to a position above the first position. In these embodiments, the wearable computing device may, in response to receiving the movement data corresponding to the upward movement, cause one or both of the view region 502 and the menu 504 to move such that the menu 504 becomes more visible in the view region 502. For example, the wearable computing device may cause the view region 502 to move upward and may cause the menu 504 to move downward. The view region 502 and the menu 504 may move the same amount, or may move different amounts. In one embodiment, the menu 504 may move further than the view region 502. As another example, the wearable computing device may cause only the menu 504 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable computing device. Other reference frames are possible as well. In embodiments where the wearable computing device is a head-mounted device, the upward movement of the wearable computing device may also be an upward movement of a wearer's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the sensor 122 described above in connection with FIG. 1A. In some embodiments, the movement data may comprise a binary indication corresponding to the upward movement. In other embodiments, the movement data may comprise an indication corresponding to the upward movement as well as an extent of the upward movement. The movement data may take other forms as well.

Figure 5B:
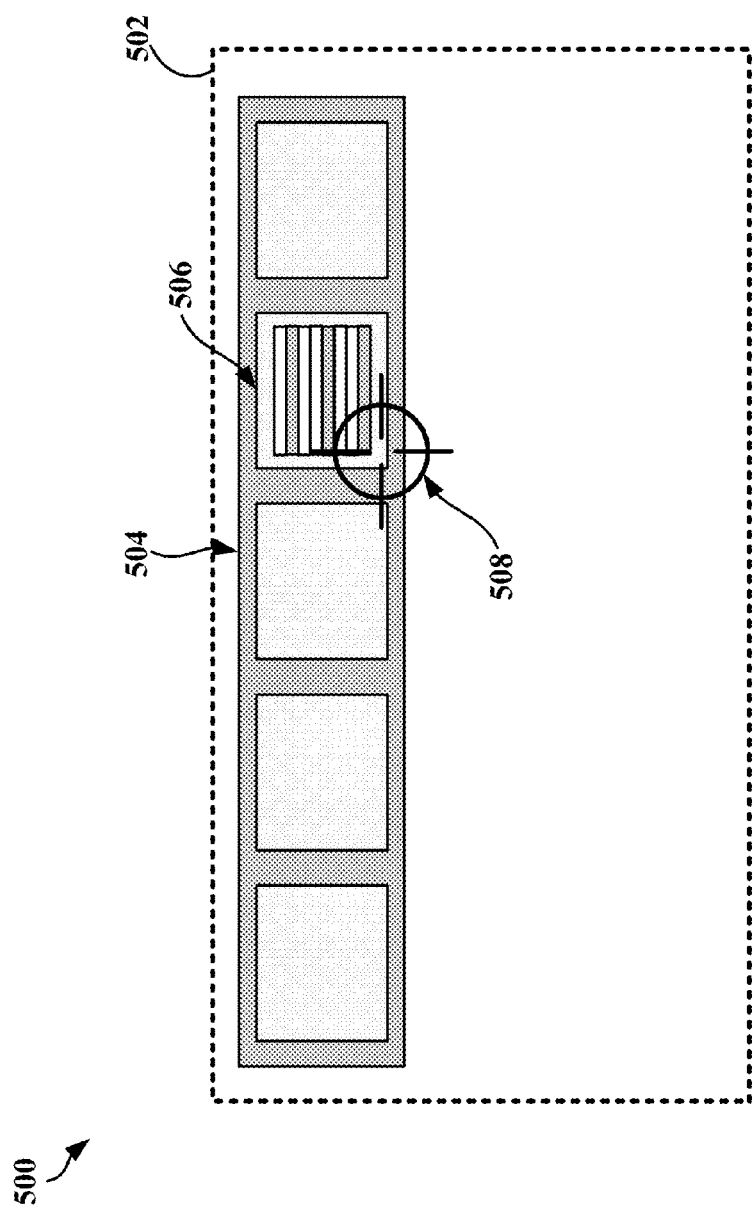
FIG. 5B shows aspects of an example user-interface after receiving movement data corresponding to an upward movement.

FIG. 5B shows aspects of an example user-interface after receiving movement data corresponding to an upward movement. As shown, the user-interface 500 includes the view region 502 and the menu 504.

As noted above, in response to receiving the movement data corresponding to an upward movement of the wearable computing device, the wearable computing device may move one or both of the view region 502 and the menu 504 such that the menu 504 becomes more visible in the view region 502.

As shown, the menu 504 is fully visible in the view region 502. In other embodiments, however, only a portion of the menu 504 may be visible in the view region 502. In some embodiments, the extent to which the menu 504 is visible in the view region 502 may be based at least in part on an extent of the upward movement.

Thus, the view region 502 may be moved in response to receiving data corresponding to an upward movement. In some embodiments, the view region 502 may be moved in an upward scrolling or panning motion. For instance, the view region 502 may appear to a wearer of the wearable computing device as if mapped onto the inside of a static sphere centered at the wearable computing device, and movement of the view region 502 may map onto movement of the real-world environment relative to the wearable computing device. A speed, acceleration, and/or magnitude of the upward scrolling may be based at least in part on a speed, acceleration, and/or magnitude of the upward movement. In other embodiments, the view region 502 may be moved by, for example, jumping between fields of view. In still other embodiments, the view region 502 may be moved only when the upward movement exceeds a threshold speed, acceleration, and/or magnitude. In response to receiving data corresponding to an upward movement that exceeds such a threshold or thresholds, the view region 502 may pan, scroll, slide, or jump to a new field of view. The view region 502 may be moved in other manners as well.

While the foregoing description focused on upward movement, it is to be understood that the wearable computing device could be configured to receive data corresponding to other directional movement (e.g., downward, leftward, rightward, etc.) as well, and that the view region 502 may be moved in response to receiving such data in a manner similar to that described above in connection with upward movement.

As shown, the menu 504 includes a number of content objects 506. In some embodiments, the content objects 506 may be arranged in a ring (or partial ring) around and above the head of a wearer of the wearable computing device. A ring or partial ring in this sense should not be considered necessarily circular, but rather may be represented by any type of arc, ellipse, or combination of arcs. In other embodiments, the content objects 506 may be arranged in a dome-shape above the wearer's head. The ring or dome may be centered above the wearable computing device and/or the wearer's head. In other embodiments, the content objects 506 may be arranged in other ways as well.

The number of content objects 506 in the menu 504 may be fixed or may be variable. In embodiments where the number is variable, the content objects 506 may vary in size according to the number of content objects 506 in the menu 504. In embodiments where the content objects 506 extend circularly around a wearer's head, like a ring (or partial ring), only some of the content objects 506 may be visible at a particular moment. In order to view other content objects 504, a wearer of the wearable computing device may interact with the wearable computing device to, for example, rotate the content objects 506 along a path (e.g., clockwise or counterclockwise) around the wearer's head. To this end, the wearable computing device may be configured to receive data indicating such an interaction through, for example, a touch pad, such as finger-operable touch pad 124. Alternatively or additionally, the wearable computing device may be configured to receive such data through other input devices as well.

Depending on the application of the wearable computing device, the content objects 506 may take several forms. For example, the content objects 506 may include one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects 506 may take other forms as well.

In embodiments where the content objects 506 include tools, the tools may be located in a particular region of the menu 504, such as the center. In some embodiments, the tools may remain in the center of the menu 504, even if the other content objects 506 rotate, as described above. Tool content objects may be located in other regions of the menu 504 as well.

The particular content objects 506 that are included in menu 504 may be fixed or variable. For example, the content objects 506 may be preselected by a wearer of the wearable computing device. In another embodiment, the content objects 506 for each content region may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some content objects 506 may fixed, while the content objects 506 may be variable. The content objects 506 may be selected in other manners as well.

Similarly, an order or configuration in which the content objects 506 are displayed may be fixed or variable. In one embodiment, the content objects 506 may be pre-ordered by a wearer of the wearable computing device. In another embodiment, the content objects 506 may be automatically ordered based on, for example, how often each content object 506 is used (on the wearable computing device only or in other contexts as well), how recently each content object 506 was used (on the wearable computing device only or in other contexts as well), an explicit or implicit importance or priority ranking of the content objects 506, and/or other criteria.

In some embodiments, the wearable computing device may be further configured to receive from the wearer a selection of a content object 506 from the menu 504. To this end, the user-interface 500 may include a cursor 508, shown in FIG. 5B as a reticle, which may be used to navigate to and select content objects 506 from the menu 504. In some embodiments, the cursor 508 may be controlled by a wearer of the wearable computing device through one or more predetermined movements. Accordingly, the wearable computing device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable computing device, like the sensor 122, or may be included in a peripheral device communicatively coupled to the wearable computing device. As another example, the selection data may be (or may be derived from) data received from a touch pad, such as the finger-operable touch pad 124 described above in connection with FIG. 1A, or other input device included in or coupled to the wearable computing device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable computing device or peripheral device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the wearer's head (which is assumed to move the wearable computing device in a corresponding manner). Alternatively or additionally, the predetermined movements may involve a predetermined movement of a peripheral device communicatively coupled to the wearable computing device. The peripheral device may similarly be wearable by a wearer of the wearable computing device, such that the movement of the peripheral device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown, a wearer of the wearable computing device has navigated the cursor 508 to the content object 506 using one or more predetermined movements. In order to select the content object 506, the wearer may perform an additional predetermined movement, such as holding the cursor 508 over the content object 506 for a predetermined period of time. The wearer may select the content object 506 in other manners as well.

Figure 5C:
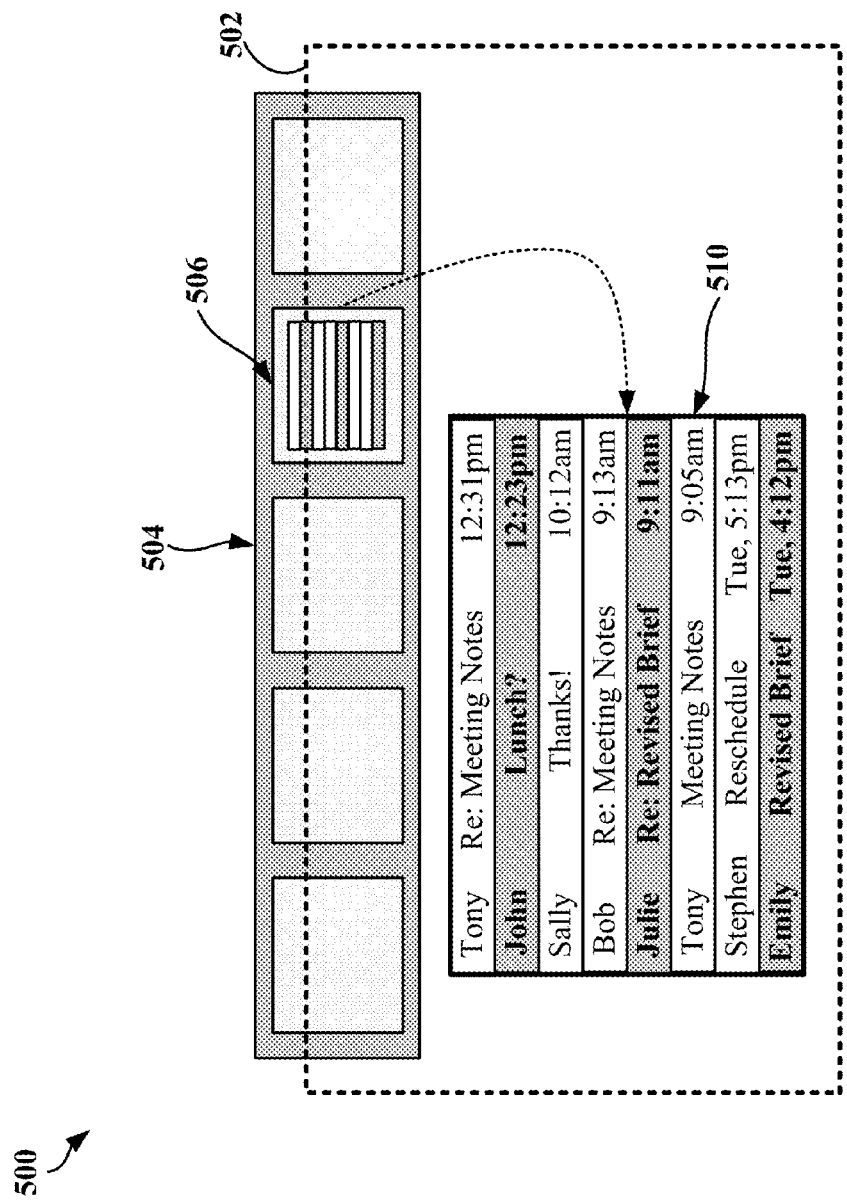
FIG. 5C shows aspects of an example user-interface after selection of a selected content object.

Once a content object 506 is selected, the wearable computing device may cause the content object 506 to be displayed in the view region 502 as a selected content object. FIG. 5C shows aspects of an example user-interface after selection of a selected content object, in accordance with an embodiment.

As indicated by the dotted arrow, the content object 506 is displayed in the view region 502 as a selected content object 510. As shown, the selected content object 510 is displayed larger and in more detail in the view region 502 than in the menu 504. In other embodiments, however, the selected content object 510 could be displayed in the view region 502 smaller than or the same size as, and in less detail than or the same detail as, the menu 504. In some embodiments, additional content (e.g., actions to be applied to, with, or based on the selected content object 510, information related to the selected content object 510, and/or modifiable options, preferences, or parameters for the selected content object 510, etc.) may be showed adjacent to or nearby the selected content object 510 in the view region 502.

Once the selected content object 510 is displayed in the view region 502, a wearer of the wearable computing device may interact with the selected content object 510. For example, as the selected content object 510 is shown as an email inbox, the wearer may wish to read one of the emails in the email inbox. Depending on the selected content object, the wearer may interact with the selected content object in other ways as well (e.g., the wearer may locate additional information related to the selected content object 510, modify, augment, and/or delete the selected content object 510, etc.). To this end, the wearable computing device may be further configured to receive input data corresponding to one or more predetermined movements indicating interactions with the user-interface 500. The input data may take any of the forms described above in connection with the selection data.

Figure 5D:
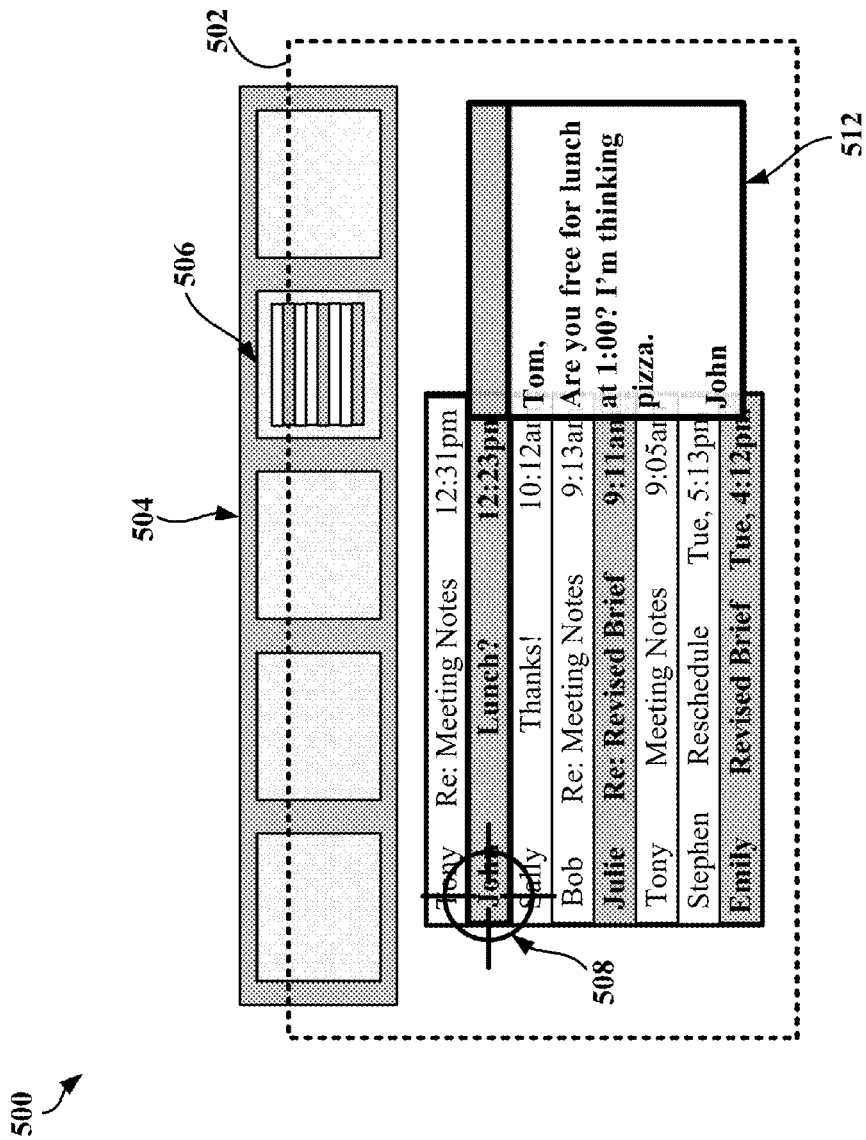
FIG. 5D shows aspects of an example user-interface after receiving input data corresponding to a user input.

FIG. 5D shows aspects of an example user-interface after receiving input data corresponding to a user input, in accordance with an embodiment. As shown, a wearer of the wearable computing device has navigated the cursor 508 to a particular subject line in the email inbox and selected the subject line. As a result, the email 512 is displayed in the view region, so that the wearer may read the email 512. The wearer may interact with the user-interface 500 in other manners as well, depending on, for example, the selected content object.

4. Exemplary Methods and Systems for Collision Avoidance

Figure 6:
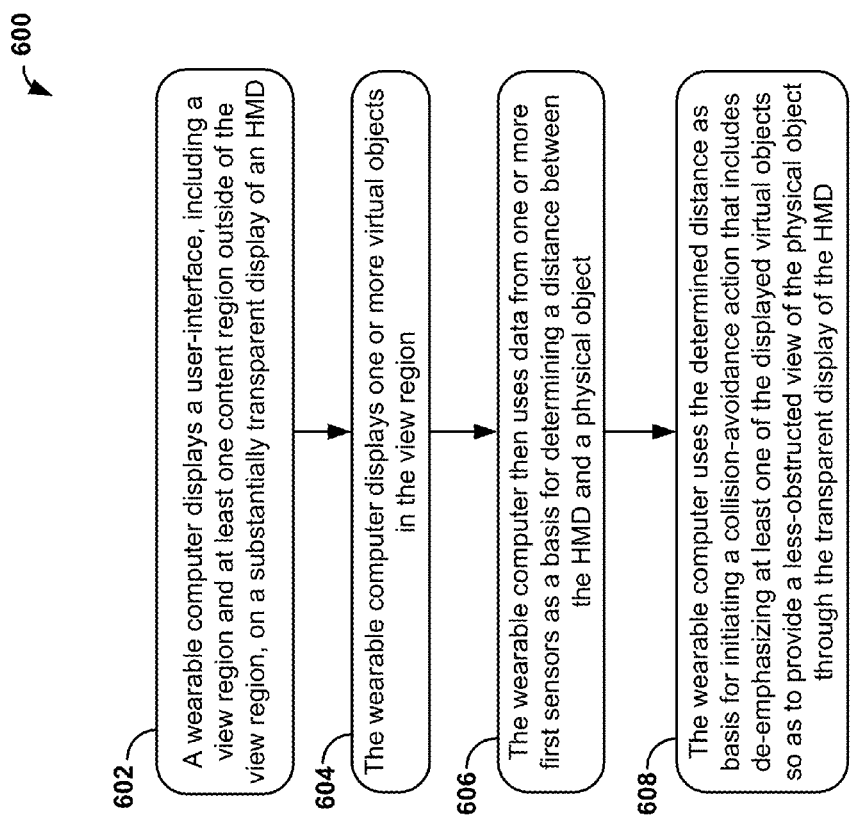
FIG. 6 is a simplified flow chart illustrating a method according to an exemplary embodiment.

FIG. 6 is a simplified flow chart illustrating a method according to an exemplary embodiment. In particular, a wearable computer having a HMD may implement method 600 in order to initiate a collision-avoidance action in response to a nearby object.

More specifically, method 600 involves the wearable computer displaying a user-interface, which includes a view region and at least one content region that is located outside of the view region, on a substantially transparent display of an HMD, as shown by block 602. Initially, the state of the user-interface is such that the view region substantially fills the field of view of the HMD, and the at least one content region is not fully visible in the field of view. In this initial state, the wearable computer displays one or more virtual objects in the view region, as shown by block 604. The wearable computer then uses data from one or more first sensors as a basis for determining a distance between the HMD and a physical object, as shown by block 606. After determining the distance between the HMD and the physical object, the wearable computer may use the determined distance as basis for initiating a collision-avoidance action that includes de-emphasizing at least one of the displayed virtual objects so as to provide a less-obstructed view of the physical object through the transparent display of the HMD, as shown by block 608.

An exemplary wearable computer may use proximity and/or relative-movement data for nearby physical objects to determine when a collision is possible and responsively unclutter the wearable computer's HMD. For instance, an exemplary wearable computer may use proximity data, which may indicate the respective distance from the wearable computer (or from sensors associated with the wearable computer) to nearby objects. This proximity data may then be used to determine when an object is too close, and to responsively unclutter the HMD (e.g., by substantially removing virtual objects from the wearer's field of view).

In addition to proximity data, some embodiments may analyze relative-movement data, which may indicate a real-world object's velocity and/or direction of movement relative to the wearable computer (or relative to sensors associated with the wearable computer). The term "relative movement" in this case may refer to the velocity and/or the acceleration of an object relative to the wearable computer measuring such data (e.g., relative to the sensors of the wearable computer measuring such data). As such, the relative movement of an object may also be considered to be the movement of the object relative to the wearer of such a wearable computer. Thus, an object's relative movement may depend not only on its own motion, but also on the motion of the wearable computer (or sensors of the wearable computer).

As noted, in some embodiments, the wearable computer may use the combination of proximity data and relative-movement data to determine whether a risk of collision with a nearby object is such that the HMD should be uncluttered. For example, the wearable computer may implement a variable threshold distance for collision avoidance, which depends upon the relative velocity of an object towards the wearable computer. In particular, the wearable computer may adjust the threshold distance according to the relative movement and/or direction of a nearby object. For instance, a wearable computer may generally reduce the threshold distance at which collision avoidance is initiated as (a) the nearby object's relative velocity towards the wearable computer increases and/or (b) as the nearby object's trajectory indicates a collision is more likely, and vice versa. An alternative implementation may utilize movement and distance data to determine a time-until-collision, and then use this time-until-collision as a basis for initiating a collision-avoidance action.

As a specific example, a first object that is approaching from ten meters away with a relative velocity of two meters per second may be assigned a determined distance that is half of the determined distance assigned to a second object approaching from ten meters away at a relative velocity of one meter per second. Because the first object in this example may pose a more immediate risk of collision, an exemplary method may advantageously initiate a more urgent collision-avoidance action. Further, some exemplary systems may be configured to only activate a collision-avoidance action in response to objects that are approaching the display regardless of determined distance. Other examples are also possible.

Some exemplary methods may involve detecting physical hazards which are outside of the field of view and initiating collision-avoidance actions in response to such hazards. For example, the HMD may be approaching an object that is too low along the ground to be seen through the display window (e.g., a curb, a stump, a stair). Although the virtual objects on the HMD may not be actively obscuring the view of this object, the object may present a tripping hazard for a wearer of the HMD a. Determining Distance

The wearable computer may use with various sensors or combinations of sensors to acquire the data that is used to initiate a collision-avoidance action. For example, some embodiments may utilize data from video cameras. As a specific example, an HMD may include front-facing cameras, which may be configured to capture images that extend beyond the field of view provided in the view region. Then, an integral or remotely attached computing device may employ image processing techniques to determine that a portion of the captured image represents a physical object and further estimate the distance between the camera and the object. In this case, the camera and wearable computer may transmit this estimated distance data to the computing system carrying out an object-detection process. Hence the object detection process may use the already determined distance as a basis for activating a collision-avoidance action.

As another example, some embodiments may utilize data from one or more acoustic or optical sensors when evaluating whether to initiate a collision-avoidance action. For instance, an exemplary embodiment may incorporate an active acoustic sensing procedure to determine the proximity of a real-world object. Such a procedure may involve emitting a well-defined acoustic pulse and then detecting reflected acoustic waves returning to the system (i.e., echoes). Additionally or alternatively, some embodiments may incorporate an active optical sensing procedure involving emission of a well-defined light wave, typically outside of the visible spectrum, and detection of reflected optical waves. In either case, an exemplary system may use such techniques to detect the existence and determine the proximity of nearby objects. Further, such techniques may be used to track the movement of these physical objects over time (e.g., by periodically repeating such techniques to determine movement).

Any of many exemplary sensors may be employed for data collection. In some cases, the sensors may process the raw data to determine the object's distance before sending out this determination to the processor responsible for the collision-avoidance action. In other cases, the processor may receive the raw data and process it to determine the object's distance.

In some embodiments, data received from the one or more distance sensors may further be used to determine the position of the physical object around the HMD. For example, sensors may be configured to detect the angle that a line between the physical object and the HMD would make with respect to the ground and with respect to the direction that the HMD is facing. In this way, the position of the physical object could be determined in three dimensions (i.e., using the two angles and the relative distance as spherical coordinates). Then, the position determination may be used to track the portion of the HMD that overlays the physical object. For example, if the direction of the vector between the HMD and the physical object is slightly left and below the direction of a vector representing the forward direction of the HMD, then the object may be most obscured by virtual objects in the lower left section of the HMD. Determination of the overlaying portion may help enable the HMD to determine the most appropriate collision-avoidance actions to be applied in response. In the example of an object below and to the left of center, some exemplary methods may only affect virtual objects within the lower left portion of the screen.

b. Determining Relative Movement

As noted, in some embodiments, an object's relative movement may be used as a basis for adjusting the determined distance of the object that will be used to initiate a collision-avoidance action. Accordingly, various types of sensors may be employed, alone or in combination, in order to determine the relative movement of a nearby object.

In some embodiments, a second set of sensors may be used to collect and report the relative-movement data. In practice, this second set of sensors may include the first set of sensors, either in part or entirely. For example, an active optical detection system may emit a short monochromatic pulse and measure the frequency, phase shift, and time delay of the returning wave. The time delay and phase shift may be used to determine the distance of the reflecting object. Additionally, the frequency and phase change may be used to determine the relative velocity of the object. In this example, the first and second sensors may in fact be the same sensors. However, it also possible that the sensors used to determine relative-movement data may be separate from those used to determine proximity data.

c. Initiating Collision-Avoidance Actions

A collision-avoidance action may be activated in response to a variety of factors. For example, determination that a physical object is within a given distance threshold may be used as a basis for activating the collision-avoidance action. Also, determination that a physical object is moving sufficiently towards an HMD at a relative velocity higher than a given velocity threshold may be used as a basis for activating the collision-avoidance action. As another example, a physical object may be determined to be accelerating in the direction of an HMD. Determination that a wearable computer is in motion or that the view region of the user-interface is sufficiently cluttered may also be used as a basis for activating a collision-avoidance action. Further, any or all of these factors may be combined to form bases for activating a collision-avoidance action. For instance, an exemplary embodiment may activate a collision-avoidance action in response to receiving data from an accelerometer indicating that the wearable computer is in motion above a certain speed threshold where the certain speed threshold is determined from data indicating that the percentage of the view region that is occupied.

In some embodiments, a physical object's determined distance may be used as a basis for activating a collision-avoidance action. For example, a method may set a distance threshold for all objects. Then, a collision-avoidance action may be activated in response to determination that a physical object is within this distance threshold. In some exemplary systems and methods, multiple distance thresholds may be associated with multiple collision-avoidance actions.

In some embodiments, distance determination or collision avoidance actions using distance as a basis for activation may only apply to physical objects sufficiently overlaid by the HMD. For example, a system may determine that a physical object is near to an HMD, but that view of the object is not overlaid by the HMD. In this example, a collision-avoidance action that de-emphasizes virtual objects displayed to the HMD would not provide a less obstructed view of the physical object. Therefore, an exemplary system may determine not to use the proximity of this physical object as a basis for activating the collision-avoidance action. Alternatively, some exemplary embodiments may determine the proximity of all detected physical objects as a basis for activating a collision-avoidance action.

Some embodiments may use determination of the relative movement of an object as a basis for activating a collision-avoidance action. For instance, some exemplary embodiments may be configured to activate a collision-avoidance action only in response to objects that are sufficiently approaching the display. In such cases, determined distance may still be used as a secondary basis for activating a collision-avoidance action, but only after the condition of determined relative movement is satisfied. Some embodiments may include setting a relative velocity threshold in which physical objects determined to be moving sufficiently towards the HMD with a velocity higher than a threshold velocity may be the basis for activating a collision-avoidance action. Likewise, if an object is determined to be accelerating towards the HMD at greater than a threshold rate of acceleration, an exemplary wearable computer may responsively initiate a collision-avoidance action. Other exemplary movement patterns may also be used.

As noted above, in some embodiments, an object's relative movement may be used as a basis for adjusting the threshold distance of a physical object at which a collision-avoidance action is initiated. For instance, again consider that a first object moving toward a sensor with a relative velocity of two meters per second and a second object moving toward the sensor with a relative velocity of one meter per second may each have a determined distance of ten meters from an HMD. However, an exemplary embodiment may assign the first object a threshold distance for of twelve meters based on the first object's relative movement. The second object may be assigned a threshold distance of eight meters based on its relative movement. Then, a collision-avoidance action may be activated in response to detection of the first object at ten meters, but not in response to detecting the second object at the same distance. Note that the specific distances and adjustments in this and other examples herein are provided for illustrative purposes, and should not be considered limiting. It is contemplated that the manner in which the distance and or movement of a nearby object are used to trigger a collision-avoidance action may vary, depending upon the specific implementation.

In some embodiments, a determined time-until-collision value may be used as a basis for initiation of a collision-avoidance action. Using the example from the section above, the first object would have an initial time-until-collision value of five seconds and the second object would have an initial time-until-collision value of ten seconds. If the system detecting these objects has a threshold time-until-collision of eight seconds, only the first object will initially surpass the threshold and activate the collision-avoidance action. The time-until-collision may be further determined or changed based on higher-order movement data (e.g., acceleration, jerk, etc.) For example, if the second object in the above example, which is initially approaching at one meter per second, is also accelerating towards the HMD at a rate of one meter per second per second (1 m/s^2), then the second object may actually reach the HMD in four seconds. Hence, the HMD may use relative movement data to anticipate this faster approach and assign a shorter time-until-collision for this object.

In some embodiments, the determination that an HMD is in motion may be used as a basis for activation of a collision-avoidance action. For example, a system may be configured to activate a collision-avoidance action only when the HMD is moving above a threshold speed. Such an embodiment may also use other bases for activation, but only after the HMD surpasses the movement threshold. Some embodiments may be configured to begin detecting physical objects only after determining that the HMD is in motion.

Some embodiments may use a level of clutter as a further basis for activating a collision-avoidance action. For example, a determination of the level of clutter may include receiving an indication of the amount of unoccupied area in the view region of a user-interface. As another example, the number and size of virtual objects displayed in the view region may be used as bases for the level of clutter. An embodiment may then activate a collision-avoidance action only when a threshold level of clutter is surpassed.

Predefined user-preferences may also indicate limits on a collision-avoidance action (for example, a time limit, collision-avoidance actions allowed, specified velocity and acceleration thresholds, etc.). As an exemplary user-preference, a system may be configured to activate a collision-avoidance action only when the view region of a user-interface is sufficiently cluttered. For instance, if only a small virtual object is displayed near the edges of the view region, the system may determine that no collision-avoidance action need be taken in response to a detected physical object.

d. De-Emphasizing Virtual Objects

Exemplary collision-avoidance actions may include de-emphasizing one or more virtual objects displayed in the view region of a user-interface. De-emphasizing virtual objects may include, for example, removing a virtual object that is determined to overlay the physical object, removing all virtual objects from the view region, moving virtual objects within the view region, moving virtual objects to areas partially within and partially without the view region, reducing the size of virtual objects, and making virtual objects at least partially transparent. Additionally, exemplary de-emphasizing actions may include portraying the changes to virtual objects in many ways.

5. Exemplary Collision-Avoidance User-Interfaces

Numerous potential collision-avoidance actions may be applied once a nearby physical object is detected. For example, a number of methods may be employed to de-emphasize one or more virtual objects. Additionally, new virtual objects, audio alarms, and/or physical indications may be used to better attract attention to the detected physical object. Further, exemplary collision-avoidance actions may be combined to maximize effect.

Figure 7A:
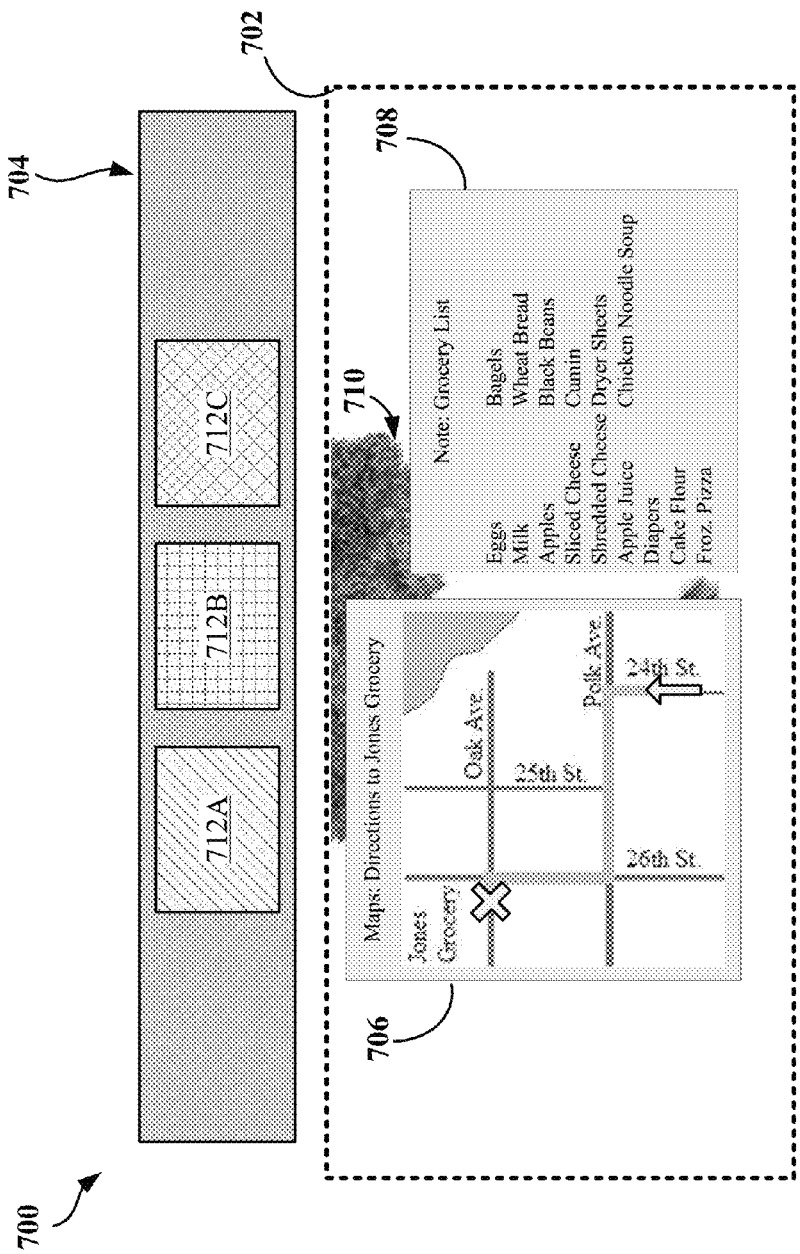
FIG. 7A illustrates an exemplary user-interface and a portion of the physical field of view beyond the display before activating collision-avoidance actions.

FIG. 7A is a simplified illustration of a user-interface, according to an exemplary embodiment. In particular, FIG. 7A illustrates a state of user-interface 700 in which a collision-avoidance action may be applied. As shown, the user-interface 700 provides virtual objects 706 and 708 in a view region 702. The user-interface 700 also provides content indicia 712A, 712B, and 712C in a content region 704 which may be outside of the displayed portion of the user-interface 700. Additionally, some of the physical field of view beyond the display is shown in FIG. 7A, including a physical object 710 near the display. As shown in FIG. 7A, the view of the physical object is substantially obstructed by virtual object 706 and virtual object 708.

FIGS. 7B to 7H are simplified illustrations of the user-interface shown in FIG. 7A in different states from that shown in FIG. 7A. In particular, each of FIGS. 7B to 7H illustrates user-interface 700 after carrying out an exemplary collision-avoidance action.

Figure 7B:
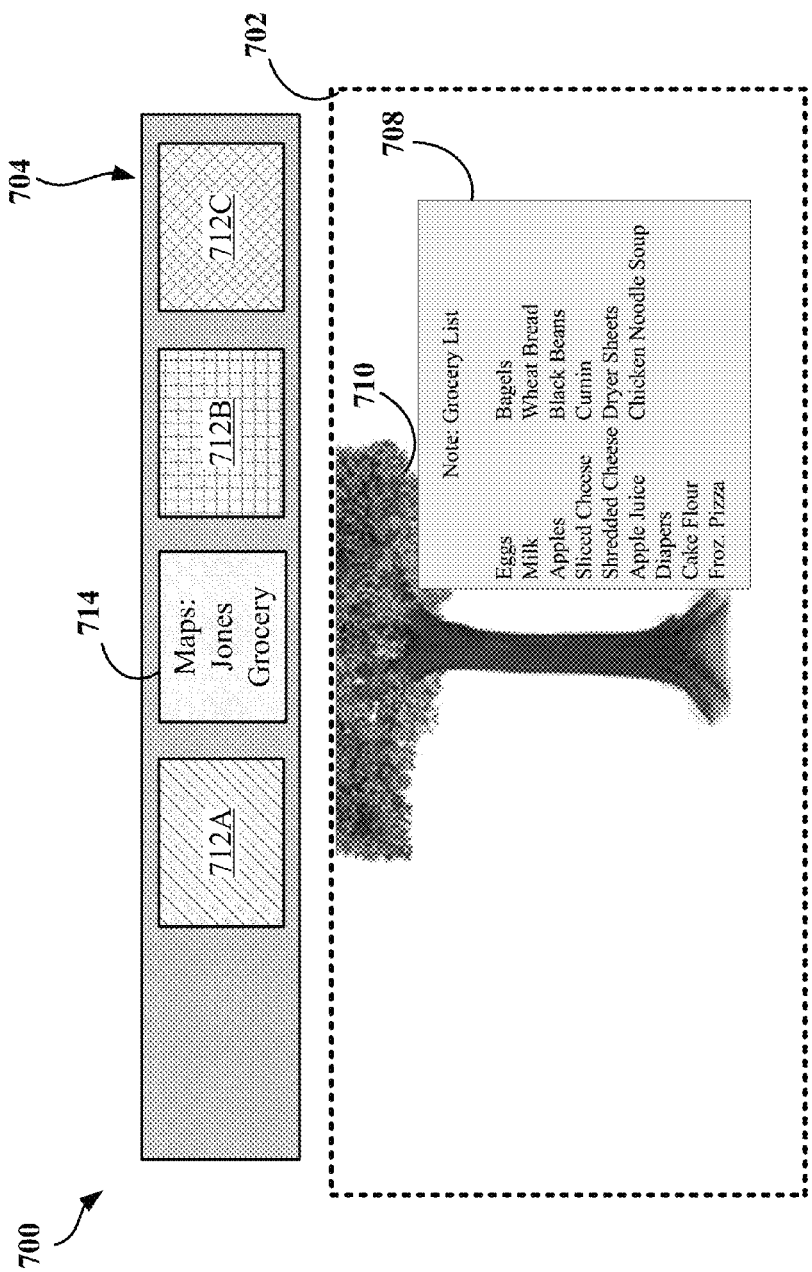
FIG. 7B illustrates an exemplary user-interface and a portion of the physical field of view beyond the display after activating an exemplary collision-avoidance action.

More specifically, FIG. 7B illustrates the results of an exemplary collision-avoidance action in which virtual object 706 has been removed from the view region 702 of the user-interface 700. Additionally, a new content object 714 corresponding to virtual object 706 has been provided in the content region 704. FIG. 7B illustrates that the physical object 710 is no longer substantially obscured, because virtual object 708 only covers a relatively small portion of the view of physical object 710. Subsequent to the collision-avoidance action activation, a user may select content object 714 from the content region and the system may responsively return virtual object 706 to the view region 702. In some cases, a content object representing the content of virtual object 706 may already occupy the content region while virtual object 706 is displayed in the view region 702. In such an instance, this exemplary collision avoidance action would simply remove virtual object 706 from the view region 702, without creating a new content object 714.

Figure 7C:
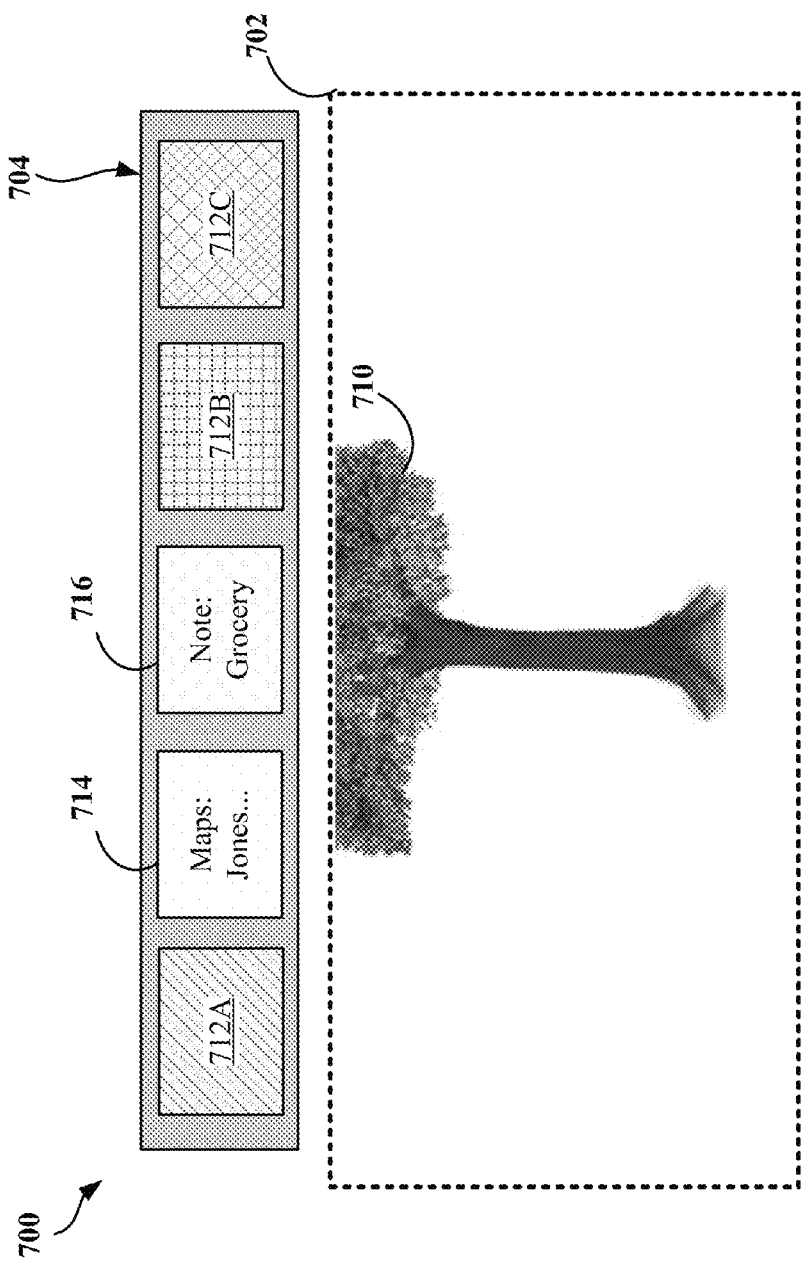
FIG. 7C illustrates an exemplary user-interface and a portion of the physical field of view beyond the display after activating an exemplary collision-avoidance action.

FIG. 7C illustrates an exemplary collision-avoidance action, in which both virtual object 706 and virtual object 708 are removed from the view region 702 of the user-interface 700. As in the above technique, if no content object corresponding to virtual object 706 is provided in the content region 704, such a content object 714 may be created and provided in the content region 704. In this procedure, a content object 716 corresponding to virtual object 708 may also be provided to the content region 704. In addition to allowing a further unobstructed view of the physical object 710, this technique may more fully draw the attention of a user than the technique in which only a single virtual object is removed from display. Advantageously, this collision-avoidance action may not require the object-detection procedure to determine the location of the physical object beyond the view region, as it might in order to apply the technique depicted in FIG. 5B.

In addition to the embodiments pictured in FIG. 7B and FIG. 7C, content objects representing each virtual object may or may not be placed in a the content region 704 for every virtual object removed from the view region 702. For example, an exemplary user-interface may include a history region, in which content objects representing recently closed content, in addition to the content region. In this case, a content object representing a removed virtual object may be created in the history region in addition to or instead of placing the content object in the content region 704. Further, removal of a virtual object may be accompanied by no new content object at all.

Figure 7D:
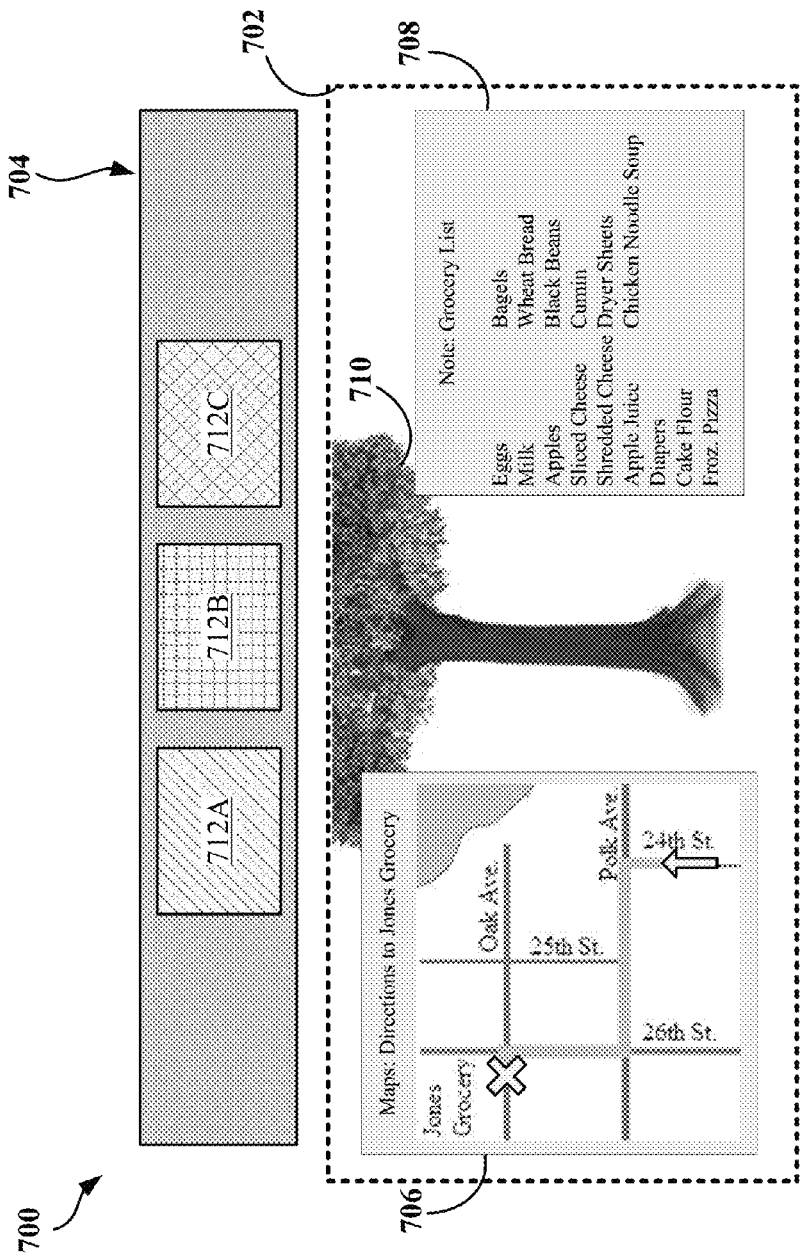
FIG. 7D illustrates an exemplary user-interface and a portion of the physical field of view beyond the display after activating an exemplary collision-avoidance action.

FIG. 7D illustrates the result of an exemplary collision-avoidance action in which virtual object 706 and virtual object 708 are moved within the view region 702 instead of being removed from the view region. As shown in FIG. 7D, the physical object 710 may be mostly visible as a result of simply moving the virtual objects 706 and 708 off to the sides of the view region 702. In some cases, movement may follow a pre-defined course. For example, a display may be configured to always move objects laterally towards the nearest lateral edge of the screen (as may be the case for the example of FIG. 7D). Alternatively, a wearable computer may be configured to specify an appropriate movement pattern based on the particular portion of the display that is currently covering the view of the physical object.

FIG. 7E illustrates the result of another exemplary collision-avoidance action, in which virtual objects 706 and 708 are moved within the view region 702. In contrast to the process illustrated by FIG. 7D, the process illustrated by FIG. 7E may move virtual objects 706 and 708 to a location at least partially outside of the view region 702. In an exemplary system, the wearable computer may be configured to store positions of virtual objects outside of a default view region in user-interface 700. As described above, the wearable computer may also be configured to change the portion of the user-interface 700 that is provided to the display. In this way, a system may provide an accessible user-interface that is in effect larger than the displayed view region. If, therefore, a virtual object is moved partially outside of the view region, the user-interface may provide a process for a user to continue examining the virtual object. For example, an HMD may be configured so that if an object is moved away from the center of the display to the left, and the HMD then is turned to the left, the object will be responsively brought back towards the center of the view region in accordance with the movement of the HMD.

As shown in FIG. 7E, the content of the virtual objects may remain intact while the virtual object is moved partially outside of the view region, as illustrated by virtual object 706. Alternatively, the content of the virtual object may be altered, as illustrated by altered virtual object 708. In this example, the title and a brief preview of the content of virtual object 708 are preserved in the view region, to allow for easy recognition of this object by a user. Many other content alterations may be applied to such a situation.

Figure 7F:
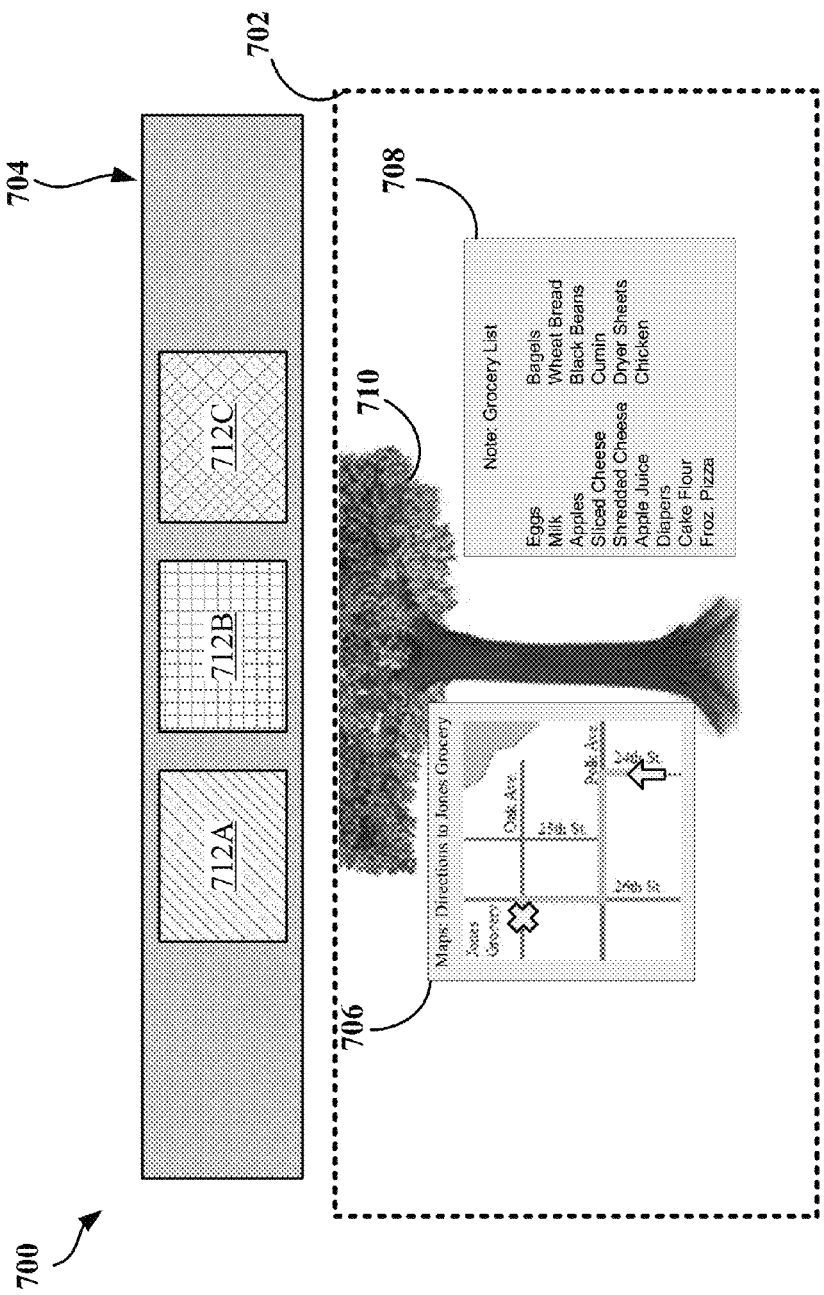
FIG. 7F illustrates an exemplary user-interface and a portion of the physical field of view beyond the display after activating an exemplary collision-avoidance action.

FIG. 7F illustrates the result of an exemplary collision-avoidance action in which virtual object 706 and virtual object 708 are still displayed in the view region 702 at roughly their original positions, but have been reduced in size. By reducing the size of virtual objects 706 and 708, the physical object 710 may be seen and virtual objects 706 and 708 may remain in their original positions. Of course, if this process is combined with another de-emphasizing technique, the virtual objects may be moved from their original positions or otherwise affected in addition to the shrinking process. As with the de-emphasizing technique illustrated in FIG. 7E, the content of each virtual object may be altered in several ways in response to a reduction in the virtual object's size. For example, the content of virtual object 706 in FIG. 7F has been reduced in size uniformly, as with the shrinking of a single picture. As another example, the content of virtual object 708 has been condensed into the title and a brief excerpt from the content. An exemplary technique may include procedures for receiving user-input selecting a minimized virtual object and responsively restoring the virtual object to its original size. In this way, virtual object 708 may behave in similar manner to a content object being shown in the view region. Many other content reduction processes may be employed. For instance, content alteration procedures may be selected based on the content of a particular virtual object, the amount of shrinking expected, and/or user-preferences.

Figure 7G:
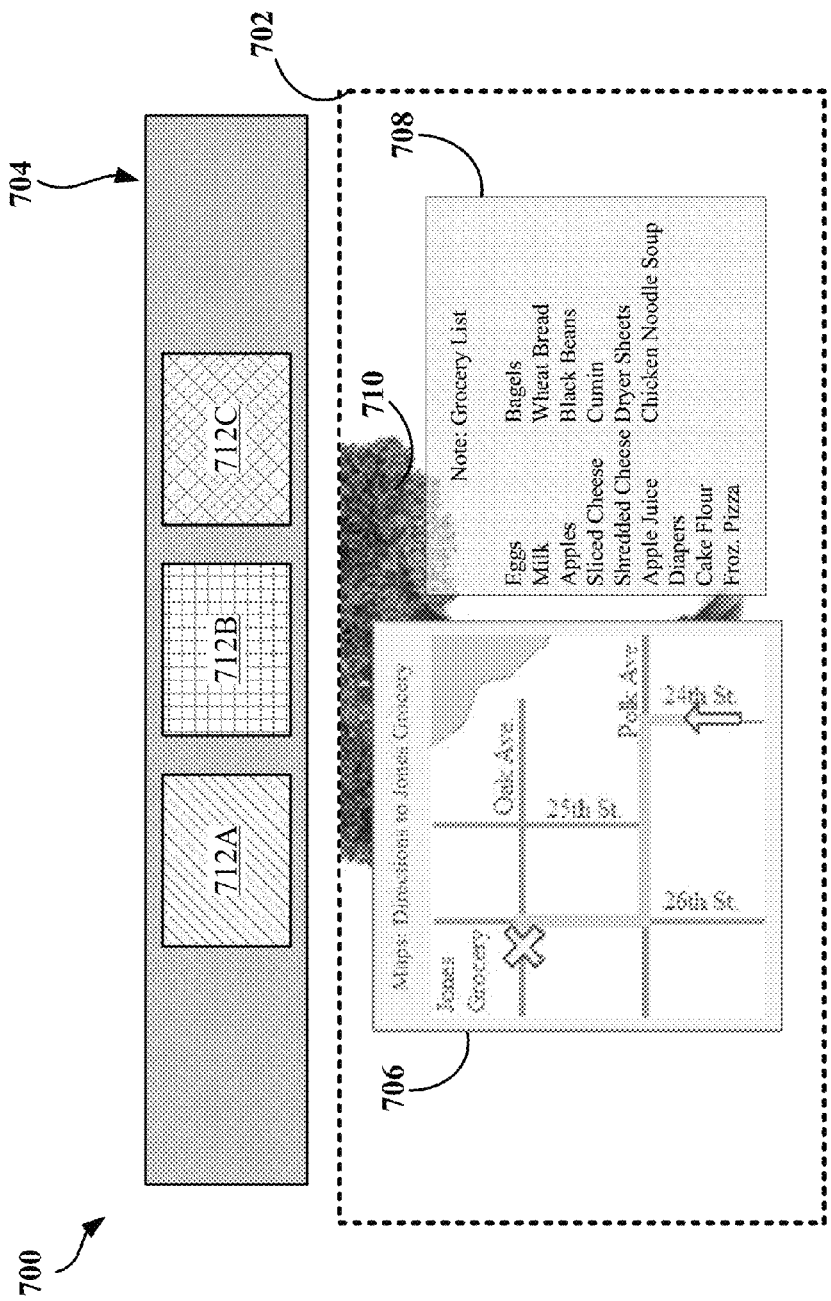
FIG. 7G illustrates an exemplary user-interface and a portion of the physical field of view beyond the display after activating an exemplary collision-avoidance action.

FIG. 7G illustrates the result of an exemplary collision-avoidance action in which virtual objects 706 and 708 are made at least partially transparent so that physical object 710 may be more easily visible through the transparent display of the HMD. An exemplary embodiment may apply transparency only to objects that are determined to be sufficiently obscuring the physical object or, alternatively, to all virtual objects within the view region (as depicted in FIG. 7G). Additionally, some embodiments may be configured to make only a portion of each virtual object transparent. For example, if a single virtual object covers the entire screen, an exemplary technique may cause a window of the virtual object to become transparent directly in front of a detected physical object while leaving the remainder of the virtual object substantially opaque.

Figure 7H:
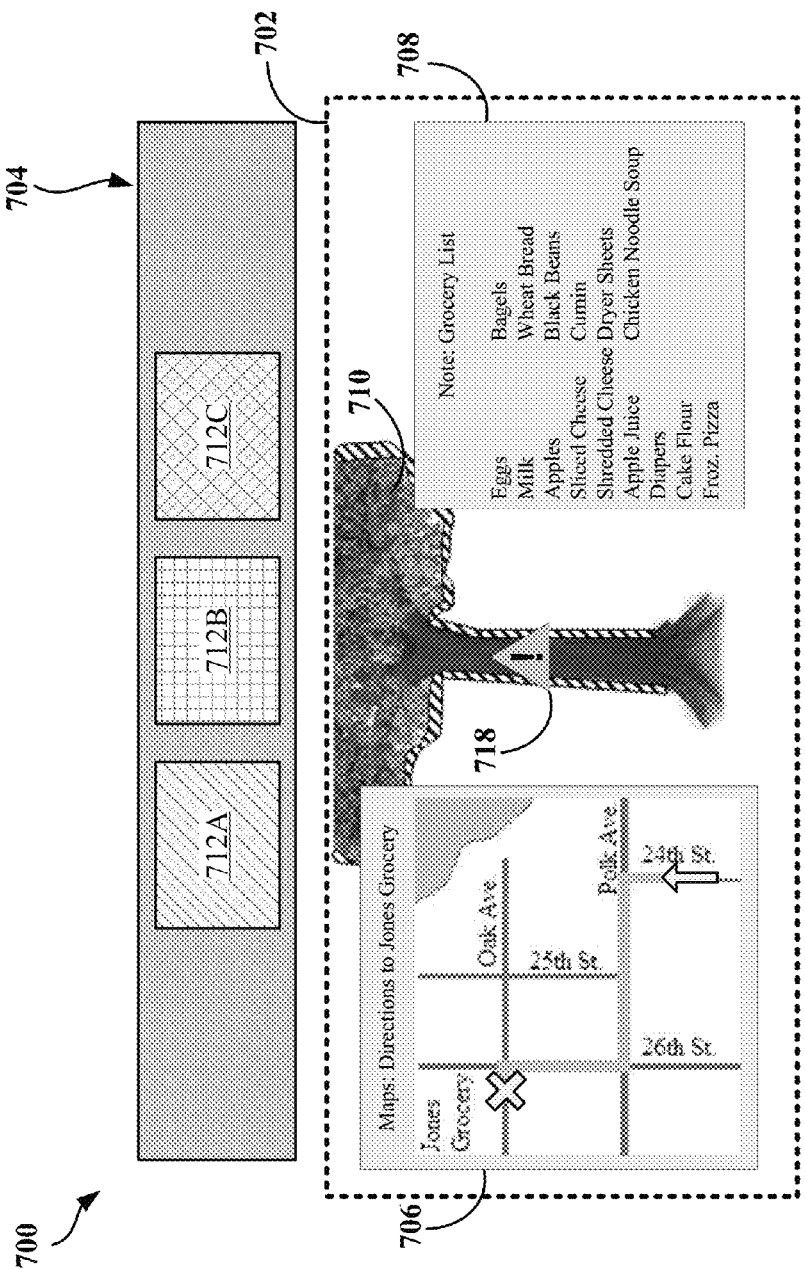
FIG. 7H illustrates an exemplary user-interface and a portion of the physical field of view beyond the display after activating an exemplary collision-avoidance action.

In addition to moving and/or de-emphasizing virtual objects, an exemplary collision-avoidance action may involve adding one or more virtual objects to highlight the detected physical object. FIG. 7H illustrates the results of one such a collision-avoidance action. More specifically, in addition to moving virtual object 706 and virtual object 708, the user-interface has presented a new virtual object 718 to draw attention to the approaching physical object 710. This example new virtual object 718 is shown as a caution symbol and a border around the detected object. However, a highlighting object may take many forms. Additionally, this technique need not be combined with other procedures if the physical object is already partially visible. Further, if a physical object is detected outside of the field of view beyond the display, the new virtual object may include a directional symbol or some other indication of where the potential obstacle is with respect to the display.

An exemplary collision-avoidance action may further specify the particular new virtual object to be presented based on characteristics of the detected physical object. For example, new virtual object 718 from FIG. 7H includes a border around the detected object. If a different physical object were detected, this border would need to be reshaped to encompass this different object. If the detected physical object were outside of the field of view covered by the display window, a new virtual object indicating the direction of the detected object may be presented as part of a collision-avoidance action. Further, if one or more detected physical objects may be most easily avoided by the wearer of the HMD moving in a particular way (e.g., moving left, ducking down, stepping up), a new virtual object, such as an arrow pointing in the movement direction and/or text instructing the wearer the way to move, may be presented.

Exemplary collision-avoidance actions may also include nonvisual alarms to alert a wearer. For example, a wearable display may include speakers, which may present an audio alarm to complement a visual cue. Advantageously, such an alarm could alert a user without needing to change the visual display. As with presenting new virtual objects, a nonvisual alarm may be specific to the situation. For example, if an object is determined to be best avoided by a wearer moving left, an audio alert may include a voice saying, "Move left". Additionally, non-visual cues could include physical cues such as vibration of the system or physical movement of display windows.

Exemplary embodiments may be further configured to combine any or all collision-avoidance actions to most effectively handle a collision avoidance action. For example, virtual objects may be both moved and turned partially transparent so that a physical object may be wholly visible and the surrounding field of view be made more visible than if the objects were simple moved. As another example, a collision-avoidance action may de-emphasize a virtual object in successive steps if initial attempts have not produced a desired affect (e.g., a wearer continues to approach a detected object in a potentially hazardous way despite an initial collision-avoidance action.) For instance, an exemplary process may include receiving and indication that an object is within a first threshold distance and responsively moving one virtual object to provide a view of the object. The process may further include receiving a subsequent indication that the detected object is within a second, closer distance threshold and responsively moving all virtual objects to provide a less obstructed view of the approaching object. Upon receiving additional indications that the object continues to pose the risk of collision, the exemplary process may include applying transparency to one or all of the virtual objects, reducing the virtual objects in size, removing the virtual objects from the viewing region entirely, and finally presenting a new virtual object to highlight the physical object. It will become obvious to persons of skill in the art to combine collision-avoidance action in many other advantageous ways.

An exemplary display may be configured to portray the moving or removing of virtual objects in various ways. For example, virtual objects that are moved from position to position within the viewing region may be shown successively at intermediate positions, to portray a pattern similar to the movement of a physical object. Such a procedure may also be applied when an object is removed from the view region and a corresponding content object is created in the content region. In this case, the object may graphically show successive progress toward the content region until the virtual object is completely removed from the view region. Another exemplary process for portraying the removal of a virtual object may include gradually making the object more transparent until it vanishes from display. As another example, virtual objects may be portrayed as reducing in size before being removed from the view region. Further, virtual objects may be portrayed as increasing in size before being removed from the view region to give the impression that the virtual objects are moving through the display to a point behind a wearer.

Another exemplary portrayal technique may help to allow a wearer to utilize their own instinctive collision-avoidance maneuvers by moving the virtual objects in such a way as to indicate a quickly approaching obstacle. For example, if the virtual objects sweep rapidly towards the edges of the screen and increase in size, a wearer may perceive that physical objects in their surroundings are closer or approaching more quickly than if virtual objects simply disappeared. Hence, such a movement pattern may portray an imminent danger to the wearer, allowing the wearer to make a more immediate adjustment to avoid a physical object. In this example, a computer may select the edge of the screen to which the virtual objects move based on the relative position of the physical object. For instance, if a physical object is detected in front of the HMD but slightly left of the field of view's center, the virtual objects may be expanded and moved off to the left of the screen. As another example, if the relative motion of a physical object is directed to a point only slightly left of the HMD, the objects may likewise sweep toward the left edge of the screen. In some embodiments, virtual objects may expand in size while becoming increasingly transparent until being removed entirely from the screen. The virtual objects in this case would not need to move toward a screen edge, but could simply be expanded in place, giving the impression that the virtual objects are passing through the HMD to a point behind a wearer.

Some exemplary procedures may include steps for de-activating the collision-avoidance action in response to receiving indication that the physical object is no longer a hazard or as a result of user-input. Exemplary collision-avoidance actions may therefore include procedures to move the virtual objects, which occupied the view region before activation of the collision-avoidance action, back to their original locations in the view region. Further, such procedures may also include re-establishing the size and opacity of the virtual objects. For example, an exemplary de-activation procedure may include storing the original position and content of the virtual objects in the view region before a collision-avoidance action is activated. Then, in response to the collision-avoidance action being de-activated, the procedure may move the original content of virtual objects back to their original positions in the view region.

Subsequent to initiating the collision-avoidance action, an exemplary embodiment may also include techniques for de-activating the collision-avoidance action in response to receiving second data from the sensors. For example, a system may activate a collision-avoidance action in response to determining that a stationary physical object has a relative movement pointed directly at the wearer of an HMD because the wearer is walking towards the stationary object. The wearer, alerted by the collision-avoidance action, may adjust course to avoid the stationary object. Then, the system may determine that the object no longer has a relative movement directed at the HMD and responsively de-activate the collision-avoidance action. As another example, the wearer of an HMD may be standing still when a cyclist suddenly turns a corner within a threshold distance of the HMD. An exemplary system may detect the nearby cyclist and activate a collision-avoidance action to alert the wearer. Subsequently, the cyclist may move beyond the threshold distance from the HMD and responsively the system may de-activate the collision-avoidance action. Many other exemplary de-activation procedures may be utilized.

The de-activation process may also result from input other than distance and relative movement data received from the sensors. For example, a user-input may be received from one or more input devices indicating that the collision-avoidance action should be de-activated. As a specific example, a collision-avoidance action may include moving a virtual object off to the left side of the view region or even into a portion of the user-interface beyond the left boundary of the view region. A wearer of the display may wish to override the collision-avoidance action and retrieve the original view of the moved virtual object. An exemplary system may be configured to receive indication from motion sensors that the wearer has quickly turned the display to the left and responsively return the virtual object to its original position. Many other user-input techniques, such as voice-command, gaze-tracked eye movement, actuation of a switch, or interaction with a touch pad, may be employed to indicate the need for de-activation of a collision-avoidance action.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
   causing a head-mountable device (HMD) to display a field of view to a user-interface mapped to a sphere, wherein the field of view is moveable with respect to the user-interface, and wherein the user-interface comprises: (i) a view region, and (ii) a set of selectable content objects arranged in at least a partial ring;
   associating a forward-looking head position with a forward-looking location of the field of view on the sphere, wherein a default arrangement of the spherical user-interface both: (i) locates the view region within the forward-looking field of view, and (ii) locates the set of selectable content objects substantially outside the forward-looking field of view, wherein the forward-looking field of view is in a direction that is generally parallel to the ground;
   displaying one or more virtual objects in the view region;
   using data from one or more first sensors as a basis for determining a distance between the HMD and a physical object; and
   using the determined distance between the HMD and the physical object as basis for initiating a collision-avoidance action, wherein the collision-avoidance action de-emphasizes one or more of the displayed virtual objects to provide a less-obstructed view of the physical object.

2. The method of claim 1, wherein using the determined distance as basis for initiating the collision-avoidance action comprises:
   determining that the physical object is less than a threshold distance from the HMD; and responsively initiating the collision-avoidance action.

3. The method of claim 1, further comprising:
   using data from one or more second sensors to determine a relative movement of the physical object with respect to the HMD; and
   using the relative movement as a further basis for initiating the collision-avoidance action.

4. The method of claim 3, wherein using the relative movement as a further basis for initiating the collision-avoidance action comprises:
   using the relative movement as a basis for determining the threshold distance between the physical object and the HMD; and
   determining that the physical object is less than the threshold distance from the HMD and responsively initiating the collision-avoidance action.

5. The method of claim 3, wherein using the relative movement as a further basis for initiating the collision-avoidance action comprises:
   using (a) the distance between the physical object and the HMD and (b) the relative movement to determine a time period until collision; and
   determining that the time period until collision is less than a threshold time period and responsively initiating the collision-avoidance action.

6. The method of claim 3, further comprising, subsequent to initiating the collision-avoidance action:
   using data from the one or more second sensors as a basis for determining a subsequent relative movement of the physical object with respect to the HMD;
   determining that a direction of the subsequent relative movement of the physical object is directed sufficiently away from the HMD such that collision with the physical object is unlikely; and
   in response to determining that the subsequent relative movement of the physical object is directed sufficiently away from the HMD, re-displaying in the view region the at least one virtual object that was de-emphasized in the collision-avoidance action.

7. The method of claim 1, further comprising:
   using data from one or more third sensors to determine that the HMD is in motion; and
   using the determination that the HMD is in motion as a further basis for initiating a collision-avoidance action.

8. The method of claim 1, further comprising:
   determining that the view region is sufficiently cluttered; and
   using the determination that the view region is sufficiently cluttered as a further basis for initiating the collision-avoidance action.

9. The method of claim 1, wherein de-emphasizing at least one of the virtual objects comprises removing at least one of the virtual objects from the view region.

10. The method of claim 1, wherein the moving the at least one of said virtual objects comprises efficiently portraying a potential hazard by moving the at least one of said virtual objects quickly from a center point of the view region toward outer edges of the view region.

11. The method of claim 10, further comprising:
determining a portion of the view region that overlays the physical object;
wherein the at least one of said virtual objects is moved quickly away from the portion of the view region that overlays the physical object.

12. The method of claim 1, wherein the physical object is outside of the field of view provided in the see-through display, and wherein the collision-avoidance action further comprises displaying a visual indication of a direction of the physical object.

13. The method of claim 1, wherein the collision-avoidance action further comprises presenting an audio alert.

14. The method of claim 1, wherein the collision-avoidance action further comprises displaying a visual indication that highlights the physical object.

15. A computing system comprising:
at least one processor;
one or more first sensors operable to generate data indicative of distances to physical objects in an environment of a head-mountable device (HMD);
data storage comprising logic executable by the at least one processor to:
cause a display of the HMD to display a field of view to a user-interface mapped to a sphere, wherein the field of view is moveable with respect to the user-interface, and wherein the user-interface comprises: (i) a view region, and (ii) a set of selectable content objects arranged in at least a partial ring;
associate a forward-looking head position with a forward-looking location of the field of view on the sphere, wherein a default arrangement of the spherical user-interface both: (i) locates the view region within the forward-looking field of view, and (ii) locates the set of selectable content objects substantially outside the forward-looking field of view, wherein the forward-looking field of view is in a direction that is generally parallel to the ground;
display one or more virtual objects in the view region;
use data from one or more first sensors as a basis for determining a distance between the HMD and a physical object; and
use the determined distance between the HMD and the physical object as basis to initiate a collision-avoidance action, wherein the collision-avoidance action de-emphasizes one or more of the displayed virtual objects to provide a less-obstructed view of the physical object.

16. The computing system of claim 15, wherein the user-input comprises detection by sensors that the head-mounted display has moved in specified movement pattern.

17. A non-transitory computer-readable medium having stored therein instructions executable by a computing device to cause the computing device to perform functions comprising:

causing a head-mountable device (HMD) to display a field of view to a user-interface mapped to a sphere, wherein the field of view is moveable with respect to the user-interface, and wherein the user-interface comprises: (i) a view region, and (ii) a set of selectable content objects arranged in at least a partial ring;
associating a forward-looking head position with a forward-looking location of the field of view on the sphere, wherein a default arrangement of the spherical user-interface both: (i) locates the view region within the forward-looking field of view, and (ii) locates the set of selectable content objects substantially outside the forward-looking field of view, wherein the forward-looking field of view is in a direction that is generally parallel to the ground;
displaying one or more virtual objects in the view region;
using data from one or more first sensors as a basis for determining a distance between the HMD and a physical object; and
using the determined distance between the HMD and the physical object as basis for initiating a collision-avoidance action, wherein the collision-avoidance action de-emphasizes one or more of the displayed virtual objects to provide a less-obstructed view of the physical object.

18. The non-transitory computer-readable medium of claim 17, wherein the functions further comprise:
using data from one or more second sensors to determine a relative movement of the physical object with respect to the HMD; and
using the relative movement as a further basis for initiating the collision-avoidance action.

19. The non-transitory computer-readable medium of claim 18, wherein the functions further comprise subsequent to initiating the collision-avoidance action:
using data from the one or more second sensors as a basis for determining a subsequent relative movement of the physical object with respect to the HMD;
determining that a direction of the subsequent relative movement of the physical object is directed sufficiently away from the HMD such that collision with the physical object is unlikely; and
in response to determining that the subsequent relative movement of the physical object is directed sufficiently away from the HMD, re-displaying in the view region the at least one virtual object that was de-emphasized in the collision-avoidance action.

20. The non-transitory computer-readable medium of claim 17, wherein the moving the at least one of said virtual objects comprises efficiently portraying a potential hazard by moving the at least one of said virtual objects quickly from a center point of the view region toward outer edges of the view region.

* * * * *